(12) United States Patent
Gong et al.

(10) Patent No.: US 10,187,443 B2
(45) Date of Patent: Jan. 22, 2019

(54) SYSTEM AND METHOD FOR ENCODING IMAGE DATA AND OTHER DATA TYPES INTO ONE DATA FORMAT AND DECODING OF SAME

(71) Applicant: C-HEAR, INC., Dallas, TX (US)

(72) Inventors: Changhong Gong, Plano, TX (US); Charles Gong, Plano, TX (US); Adena Collard-Harmon, Fort Worth, TX (US); Taha Kadado, Sachse, TX (US); Jesse Collard, Irving, TX (US)

(73) Assignee: C-Hear, Inc., Dallas, TX (US)

( * ) Notice: Subject to any disclaimer, the term of this patent is extended or adjusted under 35 U.S.C. 154(b) by 0 days.

(21) Appl. No.: 15/785,148

(22) Filed: Oct. 16, 2017

(65) Prior Publication Data

US 2018/0359302 A1 Dec. 13, 2018

Related U.S. Application Data

(60) Provisional application No. 62/518,034, filed on Jun. 12, 2017.

(51) Int. Cl.
*G06F 17/30* (2006.01)
*H04L 29/06* (2006.01)

(52) U.S. Cl.
CPC ...... *H04L 65/607* (2013.01); *G06F 17/30076* (2013.01); *G06F 17/30091* (2013.01); *G06F 17/30165* (2013.01)

(58) Field of Classification Search
None
See application file for complete search history.

(56) References Cited

U.S. PATENT DOCUMENTS

| | | | | |
|---|---|---|---|---|
| 5,559,608 A | * | 9/1996 | Kunihiro | G11B 20/00007 360/48 |
| 5,856,973 A | * | 1/1999 | Thompson | G06T 9/007 348/461 |
| 6,888,569 B2 | | 5/2005 | Fox et al. | |
| 6,915,012 B2 | | 7/2005 | Osborne et al. | |
| 6,965,646 B1 | * | 11/2005 | Firestone | H04N 21/236 375/240.26 |
| 6,990,293 B2 | | 1/2006 | Hu | |
| 7,024,534 B2 | | 4/2006 | Sasaki et al. | |
| 7,359,085 B2 | | 4/2008 | Edwards | |
| 7,480,382 B2 | * | 1/2009 | Dunbar | G11B 20/12 380/201 |
| 7,689,898 B2 | | 3/2010 | Merril et al. | |
| 7,782,373 B2 | | 8/2010 | Seo et al. | |

(Continued)

*Primary Examiner* — Shirley X Zhang

(57) ABSTRACT

A method for encoding data streams into a combined file and decoding of same, including accessing a first file having a first plurality of data bytes, accessing a second file having a second plurality of data bytes, combining the first file and the second file, comprising the steps of storing a block of data bytes of a first byte block size in the body of the combined file as a first file byte block, storing a block of data bytes of a second byte block size in the body of the combined file as a second file byte block, repeating the first and second storing steps to sequentially store all of the data bytes in the first file and the second file in the combined file, and decoding the combined file to separate the bytes of the first file and the bytes of the second file from the combined file.

23 Claims, 34 Drawing Sheets

(56) References Cited

U.S. PATENT DOCUMENTS

| | | | |
|---|---|---|---|
| 7,979,886 B2* | 7/2011 | Frojdh | H04L 65/607 |
| | | | 709/231 |
| 8,271,544 B2 | 9/2012 | Chan et al. | |
| 8,306,368 B2 | 11/2012 | Beato et al. | |
| 9,009,123 B2 | 4/2015 | Agush | |
| 2001/0013068 A1* | 8/2001 | Klemets | H04L 29/06 |
| | | | 709/231 |
| 2003/0174218 A1 | 9/2003 | Battles et al. | |
| 2003/0188182 A1* | 10/2003 | Sato | H04N 5/783 |
| | | | 713/193 |
| 2004/0141630 A1 | 7/2004 | Bhaskaran et al. | |
| 2004/0150723 A1 | 8/2004 | Seo et al. | |
| 2006/0239564 A1 | 10/2006 | Cha et al. | |
| 2007/0162571 A1* | 7/2007 | Gupta | G06Q 30/0242 |
| | | | 709/219 |
| 2008/0037658 A1* | 2/2008 | Price | G10L 19/167 |
| | | | 375/240.26 |
| 2008/0129758 A1 | 6/2008 | Fox et al. | |
| 2008/0294691 A1* | 11/2008 | Chang | G06F 17/30038 |
| 2009/0067817 A1* | 3/2009 | Chuang | G11B 20/1866 |
| | | | 386/263 |
| 2011/0097058 A1* | 4/2011 | Fan Jiang | G11B 27/034 |
| | | | 386/264 |
| 2012/0128058 A1* | 5/2012 | Bakharov | H04N 21/85406 |
| | | | 375/240.01 |
| 2012/0197966 A1* | 8/2012 | Wolf | H04N 21/23424 |
| | | | 709/203 |
| 2012/0317381 A1* | 12/2012 | Zhu | G06F 3/0608 |
| | | | 711/161 |
| 2013/0026221 A1 | 1/2013 | Murray et al. | |
| 2013/0083848 A1* | 4/2013 | Joch | H04N 19/40 |
| | | | 375/240.12 |
| 2015/0104153 A1* | 4/2015 | Braness | G11B 20/00086 |
| | | | 386/244 |
| 2015/0156240 A1* | 6/2015 | Ronca | H04N 21/26258 |
| | | | 709/219 |

* cited by examiner

SYSTEM AND METHOD FOR ENCODING IMAGE DATA AND OTHER DATA TYPES INTO ONE DATA FORMAT AND DECODING OF SAME

CROSS-REFERENCE TO RELATED APPLICATIONS

This application claims priority to and the benefit of U.S. Provisional Patent Application No. 62/518,034, filed Jun. 12, 2017, entitled DATA FORMAT SPECIFICATION AND METHOD OF BLENDING AND SEPARATING IMAGE DATA STREAM OR FILES AND OTHER DATA STREAM OR FILES INTO AND FROM THE DATA FORMAT STREAM OR FILE, the entire contents of which are herein incorporated by reference.

TECHNICAL FIELD

The present disclosure is related generally to data exchange and storage. More particularly the present disclosure relates to the blending of an image data stream or file and another non-image data stream or file into a single data format.

BACKGROUND

Image data streaming or files are popular media to share pictures on computers or devices, over the internet or other networks, and are viewed on a number of different computing devices, like smartphones. But in many cases, it may be desirable to share or store other information while viewing and storing the image data, especially to see the picture and hear audio at the same time.

Current techniques for this usage include storing or exchanging the image data or file separately from the non-image data or file. For example, users store or exchange the pictures with JPEG files, and the voice or audio data in way or mp3 files alongside the image files. The problem with this method is that, in order to see the image and hear the associated audio at the same time, the users have to do two actions to save or transfer two data files, one for the image, another for the audio.

Video media data or file has both "moving" image and audio information data, but this is a different media usage. The video takes more space to store, and wider network bandwidth to exchange, and the resolution of the image frames in the video file is much lower than the resolution that can make up the image data format.

Therefore, what is needed is a method and technique for blending the image data stream or file along with non-image data or files in a single data stream or file, a method and technique for separating and returning the image data stream or file and the non-image streams or files from the single blended data stream or file generated, a stream data or file data structure or format for the blended single stream or file, and an application program to implement the methods of blending and separating, noted above.

SUMMARY

In aspect thereof, a method of a codec for encoding data streams into a combined file is provided. The method comprises accessing a first file having a first plurality of data bytes, accessing a second file having a second plurality of data bytes, combining the first file and the second file to provide the combined file containing a header and a body, comprising the steps of in a first storing step, storing a block of data bytes of a first byte block size, from the first plurality of data bytes, in the body of the combined file as a first file byte block, wherein a byte block size includes at least one or more bytes of data, in a second storing step, sequentially storing a block of data bytes of a second byte block size, from the second plurality of data bytes, in the body of the combined file as a second file byte block, repeating the first and second storing steps to sequentially store all of the data bytes in the first file and the second file in the combined file, and storing, in the header, information relating to the first byte block size and the second byte block size.

In another embodiment, the first file is of a first file format and the second file is of a second file format.

In another embodiment, the first file is an image file and the second file is a non-image file.

In another embodiment, the bytes are stored in sequential and adjacent storage locations in the combined file.

In another embodiment, the method further comprises transferring the combined file to an application processing block to decode the combined file into the first and second files by the steps of reading the header to determine the byte block size of each of the first and second files, sequentially accessing a number of bytes associated with the byte block size of the first file and a number of bytes associated with the byte block size of the second file, and creating the first and second files with the accessed bytes.

In another embodiment, the byte block size of the first file and the byte block size of the second file are calculated in accordance with a ratio that is a number of bytes of the first file to a number of bytes of the second file.

In another embodiment the step of calculating the byte block size for each of the first file and the second file includes determining which of the first file and the second file includes a greater number of bytes, dividing the number of bytes of the first file or the second file that includes the greater number of bytes by the other one of the first file or the second file to produce a result, determining if the result includes a remainder and, if so, rounding the result up to an integer that is a next integer up from the result, and setting the byte block size of the first file or the second file that includes the greater number of bytes to be equal to the integer.

In another embodiment, if a total number of data blocks in either of the first and second data files causes, after all previous bytes in the first or second file are written, there to be a number of bytes left in either the first or second file that is, for the first file, less than the first byte block size, or, for the second file, less than the second byte block size, the method further comprises storing a partial byte block in the combined file, wherein the partial byte block is associated with one of the first or second files and wherein the partial byte block includes a number of data bytes less than the byte block size for the first or second file that is associated with the partial byte block.

In another embodiment, the step of calculating the byte block size for each of the first file and the second file further includes setting the byte block size of the second file to one byte and determining if a speed multiplier is to be set and, if so, setting the speed multiplier, wherein the speed multiplier is a value to manipulate by the byte block size of the first file and the byte block size of the second file in order to set the byte block size of the first file to the result of the value multiplied by the byte block size of the first file and to set the byte block size of the second file to the result of the value multiplied by the byte block size of the second file.

In another aspect thereof, a method of a codec for decoding a data stream of a combined file into separate data streams is provided. The method comprises analyzing header data included in the combined file, calculating a byte block size for each of a first data stream and a second data stream, wherein a byte block is a number of bytes of data within a file, reading a first file byte block included in the combined file, wherein the first file byte block includes a number of bytes in the combined file corresponding to the byte block size calculated for a first data stream, writing the first file byte block to a first file, reading a second file byte block included in the combined file, wherein the second file byte block includes a number of bytes in the combined file corresponding to the byte block size calculated for a second data stream, and writing the second file byte block to a second file.

In another embodiment, the first file is of a first file type and the second file is of a second file type.

In another embodiment, the first file is an image file and the second file is a non-image file.

In another embodiment, the method further comprises determining if each byte included within the combined file has been read from the combined file and written to one of the first file or the second file and repeating, upon a determination that each of the bytes included within the combined file have not been written to one of the first file or the second file, the reading, writing, and determining steps.

In another embodiment, calculating the byte block size for each of a first data stream and a second data stream includes reading byte block size data in the header data, wherein the byte block size data includes byte block sizes used during creation of the combined file.

In another aspect thereof, a system for encoding data streams into a combined file and decoding the combined file into separate data streams is provided. The system comprises a network interface coupled to a processor and a memory to the processor, the processor configured to access a first file having a first plurality of data bytes, access a second file having a second plurality of data bytes, combine the first file and the second file to provide the combined file containing a header and a body, wherein, during combining, the processor is further configured to in a first storing step, store a block of data bytes of a first byte block size, from the first plurality of data bytes, in the body of the combined file as a first file byte block, wherein a byte block size includes at least one or more bytes of data, in a second storing step, sequentially store a block of data bytes of a second byte block size, from the second plurality of data bytes, in the body of the combined file as a second file byte block, repeat the first and second storing steps to sequentially store all of the data bytes in the first file and the second file in the combined file, and store, in the header, information relating to the first byte block size and the second byte block size.

In another embodiment, the first file is of a first file format and the second file is of a second file format.

In another embodiment, the first file is an image file and the second file is a non-image file.

In another embodiment, the step of calculating the byte block size for each of the first file and the second file includes determining which of the first file and the second file includes a greater number of bytes, dividing the number of bytes of the first file or the second file that includes the greater number of bytes by the other one of the first file or the second file to produce a result, determining if the result includes a remainder and, if so, rounding the result up to an integer that is a next integer up from the result, and setting the byte block size of the first file or the second file that includes the greater number of bytes to be equal to the integer.

In another embodiment, the processor is further configured to analyze header data included in the combined file, calculate the byte block size for each of the first file and the second file based on byte block size data included in the header data, record a combined file byte block included in the combined file, wherein the combined file byte block includes a number of bytes in the combined file corresponding to the byte block size calculated for the first file, copy the combined file byte block to a third file, record a next combined file byte block included in the combined file, wherein the next combined file byte block includes a number of bytes in the combined file corresponding to the byte block size calculated for the second file, and copy the next combined file byte block to a fourth file.

In another embodiment, the processor is further configured to ascertain whether each byte included within the combined file has been read from the combined file and written to one of the third file or the fourth file, and repeat, upon a determination that each of the bytes included within the combined file have not been written to one of the third file or the fourth file, all of the record, copy, and ascertain steps.

A data structure or format (hereinafter referred to as chm format) for the blended stream or file is created in accordance with this disclosure. The data structure or format has two parts: the metadata bytes at the header section in the beginning and the raw data bytes at the body section. Along with the chm data format, a protocol (hereinafter referred to as chm formatting) is created to blend an image data stream or file with one or more non-image data streams or files.

In one aspect, a method of blending an image file with a non-image file is provided. The method may begin with accessing both image and non-image data streams or files by the application program which implements the technology set forth by this disclosure. Once accessed, the application may read the data information of both image and non-image streams or files, and based on the chm format, it may create and write the metadata bytes into the beginning header section of a chm format data stream or file. Next, the application may read one chunk of data bytes from each of the image and non-image data streams or files, and write the two chunks of data bytes into the chm format stream or file. And the application may continue and repeat reading one chunk of data bytes from two data streams and writing the two chunks of data bytes into the chm format data stream or file until it reaches the end of the two image and non-image data streams or files. The process of this method is called "chm encoding."

In another aspect, a method of separating the chm format data stream or file and returning back the image stream or file and the non-image stream or file is provided. The method may begin with accessing the chm format data stream or file which is generated by the blending method above with the application program. Once accessed, the application may read and retrieve the metadata information from a header section of the stream or file. Next, based on protocol, the application may read two chunks of bytes from the chm format data stream or file, and it may write one chunk of bytes into the image stream or file, and another chunk of bytes into the non-image stream or file. And the application may continue and repeat reading the next two chunks of bytes from the chm format data stream, and writing each chunk of the bytes into their own data streams or files until it reaches the end of the chm format data stream or file, and it returns the image and non-image data streams or files back to their original states. The process of this method is called "chm decoding."

The application program introduced above is the software which implements the blending/separating methods and the protocol to execute the processes to blend/separate the image the non-image data streams or files into/from the single chm format data stream or file.

BRIEF DESCRIPTION OF THE DRAWINGS

For a more complete understanding, reference is now made to the following description taken in conjunction with the accompanying Drawings in which.

DETAILED DESCRIPTION

Figure 1:
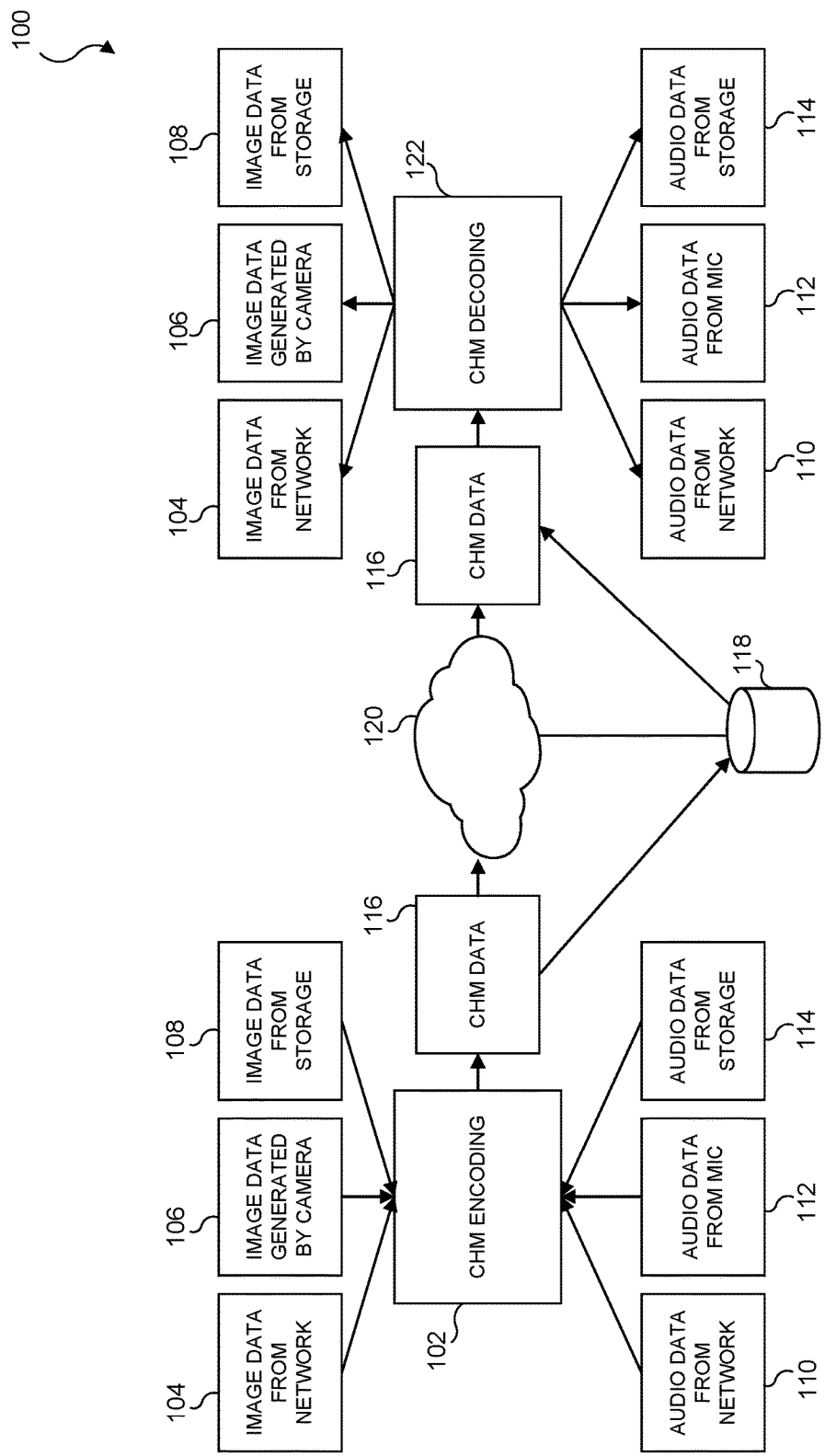
FIG. 1 illustrates a flowchart of a CHM encoding and decoding process for image and non-image data streams, in accordance with various embodiments of the present disclosure.

Referring now to the drawings, wherein like reference numbers are used herein to designate like elements throughout, various views and embodiments are illustrated and described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Digital information such as images, audio, video, text, etc., is presented and stored as data binaries or bytes. When those data bytes are stored in the media depository, they are called files. When they are loaded in the memory of computing devices or are transmitted in the wire of the network, they are called streams. Blending (encoding) and separating (decoding) operations process the data bytes in the streams or the files.

Different types of information (images, audio, video, text, documents, programs, etc.) have different data byte structures, called data formats, when either in the stream or in the file. For example, when an image is stored in the disk or exchanged via the network, if the image is using JPEG data format, it is the JPEG format or structure of data bytes are stored in a file, or transmitted in a stream over the network. Similarly, when audio is stored on the disk or exchanged via the network, if the audio is using an MP3 data format, it is the MP3 format or structure of data bytes that are stored in a file, or transmitted in a stream over a network. So, saving or transmitting an image and an image-related non-image (like audio) has to do two individual processes or tasks, one for image, another for non-image.

The present disclosure provides a unique data stream or file format and structure—CHM format, having all the data bytes of both the image and the non-image stream or file, and thus is a combined file or data stream. Along with the CHM format, this disclosure provides the protocol—CHM formatting protocol, having the method, algorithm, and specification to blend the image and non-image data streams or files into one CHM data stream or file, or separate the CHM data stream or file back to the image and non-image data streams or files in their original state.

Referring now to FIG. 1, there is illustrated a flowchart of one embodiment of a CHM encoding and decoding process 100 for image and non-image data streams in accordance with various embodiments of the present disclosure. One example includes an image and its description. An encoding method 102 disclosed herein may access image data from a network 104 image data generated by a camera 106, or image data from storage 108. The encoding method 102 may also access audio data from a network 110, audio data from a mic 112, or audio data from storage 114. The encoding method 102 then reads the data bytes from the image and non-image (audio) stream or file, and blends and writes the data bytes into one single stream of CHM data 116 or a CHM file with the CHM data format. The CHM data 116, which contains both image and non-image data, can be saved into data storage 118 or transmitted to others over a network 120 with one single step. And a decoding method 122 disclosed herein separates the image and the audio back to their original states before the image is displayed and the image audio is played.

The image data stream or file format contemplated herein may be any digital image format. Examples of image data streams or files contemplated herein include, but are not limited to, JPEG, GIF, TIFF, PNG, Bitmap, RAW, PNM, WEBP and the like.

The non-image data stream or file format contemplated herein may be any digital non-image format. Examples of non-image data streams or formats may include text data, word processing data, audio data such as MP3, MP4, AIFF, WAY, etc., video data, and the like.

The blending (encoding) and separating (decoding) methods or processes are executed by an application program running in a computing device. The computing devices contemplated herein may include, but are not limited to, desktop computers, laptop computers, tablet computers, handheld computers, smart phones and other cellular phones, and similar internet enabled mobile devices, digital cameras, any digital image generating and processing devices, a customized computing device configured to specifically carry out the methods contemplated in this disclosure, and the like. The application program running in the computing device contemplated herein may include, but is not limited to, the software executables, the component or library via API called by other software, or the Web APIs or Web Services, and the like.

After they are separated from the CHM format stream or file, the image or non-image data bytes and their structures or formats are back in their original states without any changes, so that they can be presented by their players or processors as the original data streams or files without any changes in quality or functions.

Figure 2:
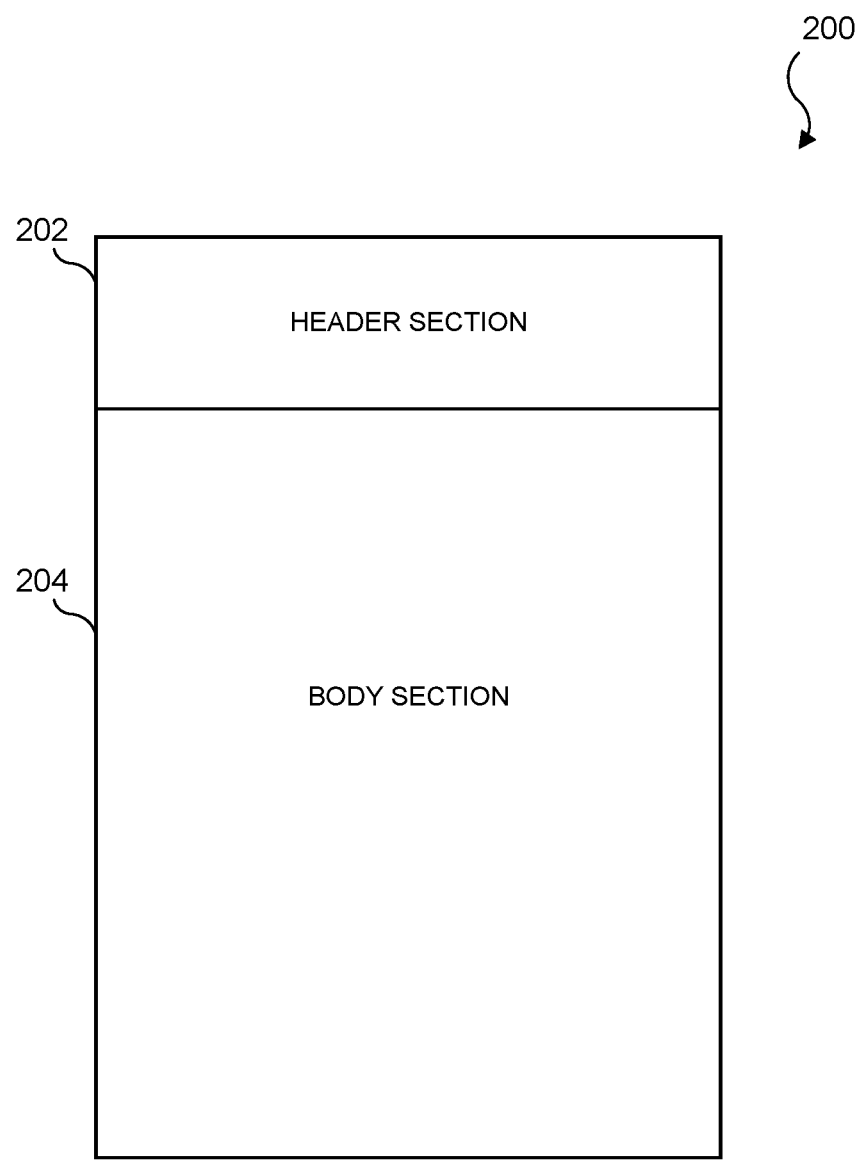
FIG. 2 illustrates a data structure or format, referred to as CHM format, for a blended stream or file, in accordance with various embodiments of the present disclosure.

Referring now to FIG. 2, there is illustrated a data structure or format 200, referred to as CHM format, for the blended stream or file, in accordance with various embodiments of the present disclosure. The data structure or format 200 has two parts: a metadata header section 202 that includes metadata bytes at the beginning and a body section 204 that includes raw data bytes. The metadata header section 202 records the blending protocol, and other information, such as data size and data format, of the original image and non-image data stream or file, and the base block size of blending and separating. The blended data stream or file is called "CHM" format stream or "CHM" format file, respectively.

A data process protocol, referred to as CHM formatting, for blending and separating two data streams or files is provided. The protocol defines how to determine the block sizes for breaking the image and non-image data byte streams or files based on their original data sizes, and defines the algorithm, steps and sequences to read and write the blocks of image data bytes and non-image data bytes, so as to blend and separate the image data stream or file and non-image data stream or file.

Figures 3A, 3B:
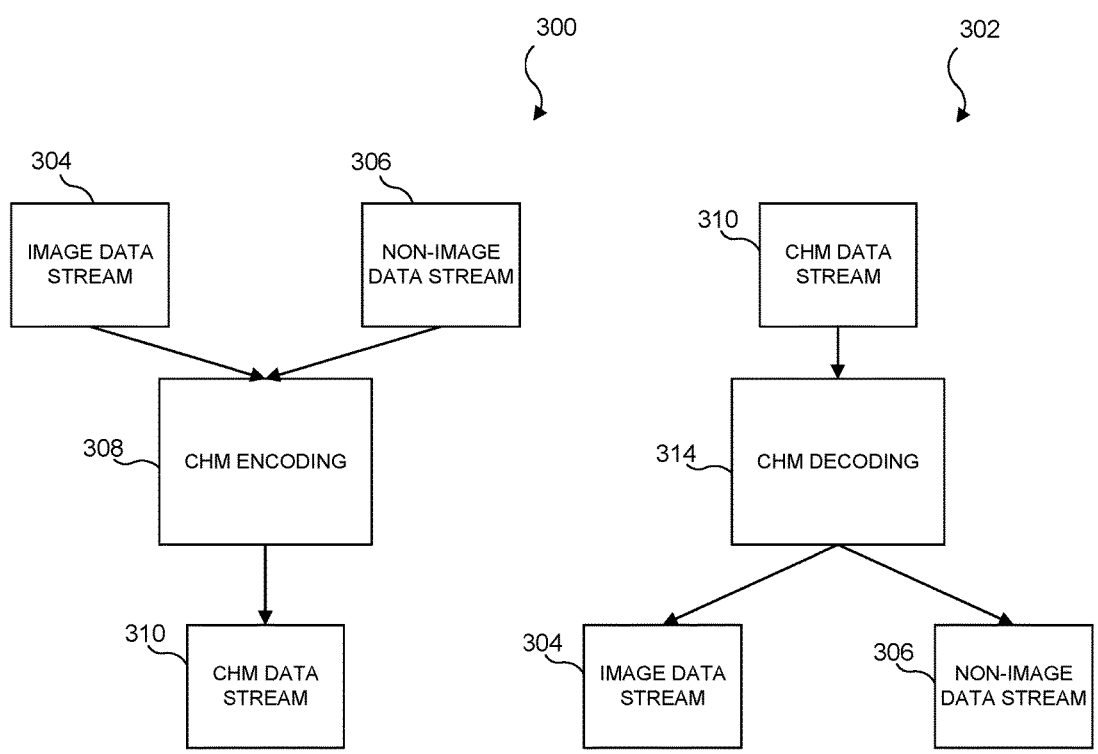
FIG. 3A illustrates a flowchart of a method of blending or encoding an image stream or file with a non-image stream or file into a CHM format data stream, in accordance with various embodiments of the present disclosure.
FIG. 3B illustrates a flowchart of a method of separating or decoding an image stream or file and a non-image stream or file from a CHM format data stream, in accordance with various embodiments of the present disclosure.

Referring now to FIGS. 3A and 3B, there is illustrated a method of blending or encoding an image stream or file with a non-image stream or file into a CHM format data stream or file is and decoding of the same is provided, in accordance with various embodiments of the present disclosure. FIG. 3A illustrates a flowchart of one embodiment of an encoding process 300 and FIG. 3B illustrates a flowchart of one embodiment of a decoding process 302. The process 300 may begin with accessing both a target image data stream 304 (or target image file) and a target non-image data stream 306 (or target non-image file) by an application program configured to perform a CHM encoding operation 308. Once accessed, the program may read data information from both the image data stream 304 and the non-image data stream 306, create metadata header bytes based on the CHM data format, and write the header bytes at a beginning section of a CHM data stream 310 (or CHM file). Next, based on the data of the image data stream 304 and the non-image data stream 306, using the CHM formatting protocol, the program may calculate a block size for breaking up the image data stream 304 and the block size for breaking up the non-image data stream 306. Then, the program may read one block of data bytes from the image data stream 304, and one block of data bytes from the non-image data stream 306, and write the two blocks of data bytes in order into the body section of the CHM data stream 310. The program may continue to read the next two blocks of data bytes from the image data stream 304 and the non-image data stream 306, and may generate the single CHM data stream 310, and thus may complete the blending or CHM encoding process. The CHM format data stream 310 may include all the data bytes of the image data stream 304 and all the data bytes of the non-image data stream 306.

As shown in FIG. 3B, a method of separating or decoding the single CHM data stream 310 and returning the image data stream 304 and the non-image data stream 306 is provided. The method, by a program configured to perform a CHM decoding operation 314, may begin with accessing the CHM data stream 310 which may be generated by the blending method described with respect to FIG. 3A. Once accessed, the program may read the metadata header section of the CHM data stream 310 and then retrieve the metadata which has the blending protocol and the information of the original image data stream 304 and non-image data stream 306. Next, based on the image data stream 304 and the non-image data stream 306, with the CHM formatting protocol, the program may calculate out the block size used to break out the image data stream 304 and the block size used to break out the non-image data stream 306.

The program may read one block of bytes from the body section of the CHM data stream 310 and write the byte block into the image data stream 304, and read another block of bytes from the body section of the CHM data stream 310 and write the byte block into the non-image data stream 306. The program may continue to read the next two blocks of bytes from the body section of the CHM data stream 310, and write each data byte block into the image and non-image data streams 304 and 306 accordingly, and the program may repeat reading/writing steps until it reaches the end of the CHM data stream 310, returning the image and non-image data streams 304 and 306 back to their original states without changing any bytes of their data and the formats, thus with no change of the qualities or features of them.

Figure 4:
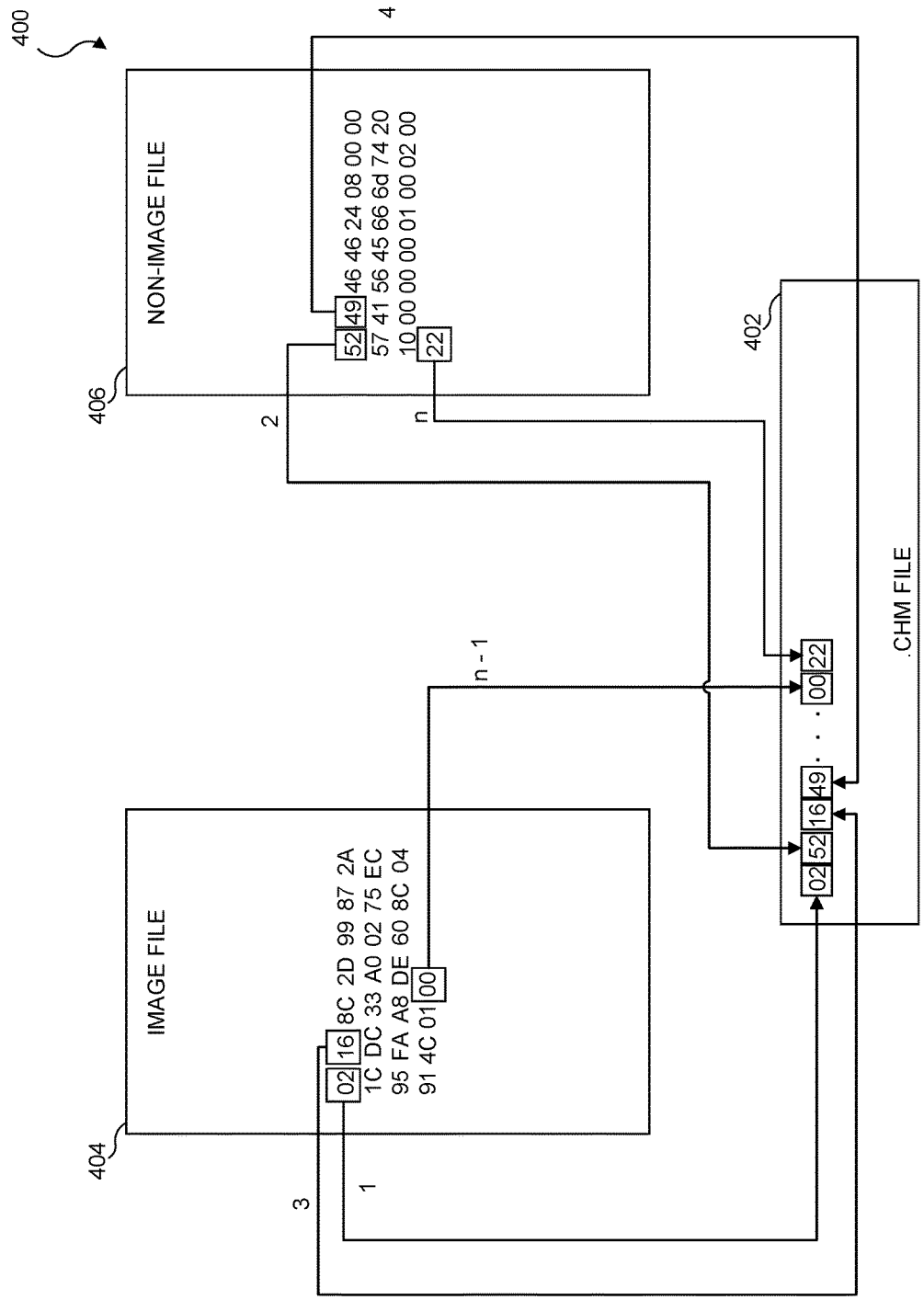
FIG. 4 illustrates a diagrammatic view of one embodiment of a CHM file encoding process, in accordance with various embodiments of the present disclosure.

Referring now to FIG. 4, there is illustrated a diagrammatic view of one embodiment of a CHM file encoding process 400 in accordance with various embodiments of the present disclosure. The body section of a CHM file may be created by blending the bytes of one file or data stream with one or more other files or data streams. As illustrated in FIG. 4, CHM file 402 is created by blending the bytes of an image file 404 and a non-image file 406. It should be understood that the image file 404 and non-image file 406 may be any file type, even two image files or two non-image files, and that an image file and a non-image file are used for example purposes. In some embodiments, a priority for the blending algorithm or protocol is to ensure the bytes from each of the files are distributed within the CHM file 402 as evenly as possible, even though the image file 404 and the non-image file 406 may not be identical in size.

The example shown in FIG. 4 demonstrates how an algorithm may perform the encoding process in the event that two files happen to have the same number of bytes. The bytes of the image file 404 and the non-image file 406 are represented in FIG. 4 in hexadecimal format. At a first step 1, the encoder copies a first byte "02" from the image file 404 and writes the first byte "02" as the first byte of the body section of the CHM file 402. At second step 2, the encoder copies a first byte "52" from the non-image file 406 and writes the first byte "52" as the next byte of the body section of the CHM file 402. At a third step 3, the encoder copies a second byte "16" from the image file 404 and writes the second byte "16" as the next byte in the body section of the CHM file 402. At a fourth step 4, the encoder copies a second byte "49" from the non-image file 406 and writes the second byte "49" as the next (and fourth) byte in the body section of the CHM file 402.

This process of alternating between the image file 404 and the non-image file 406 to copy a byte at a time from each continues for all the bytes in the image file 404 and the non-image file 406 until all bytes from the image file 404 and the non-image file 406 are written to the CHM file 402. At a penultimate step n−1, the encoder copies a last byte "00" from the image file 404 and writes the last bye "00" to the body section of the CHM file 402. At a last step n, the encoder copies a last byte "22" from the non-image file 406 and writes the last byte "22" to the body section of the CHM file 402. After the last step n, the CHM file 402 is completed, the CHM file 402 now containing all bytes from the image file 404 and the non-image file 406 blending together. The CHM file 402 thus may be the same file size as the sum of the file sizes of the image file 404 and the non-image file 406, as the CHM file contains the bytes of each of the image file 404 and the non-image file 406, with little other information added.

Figure 5:
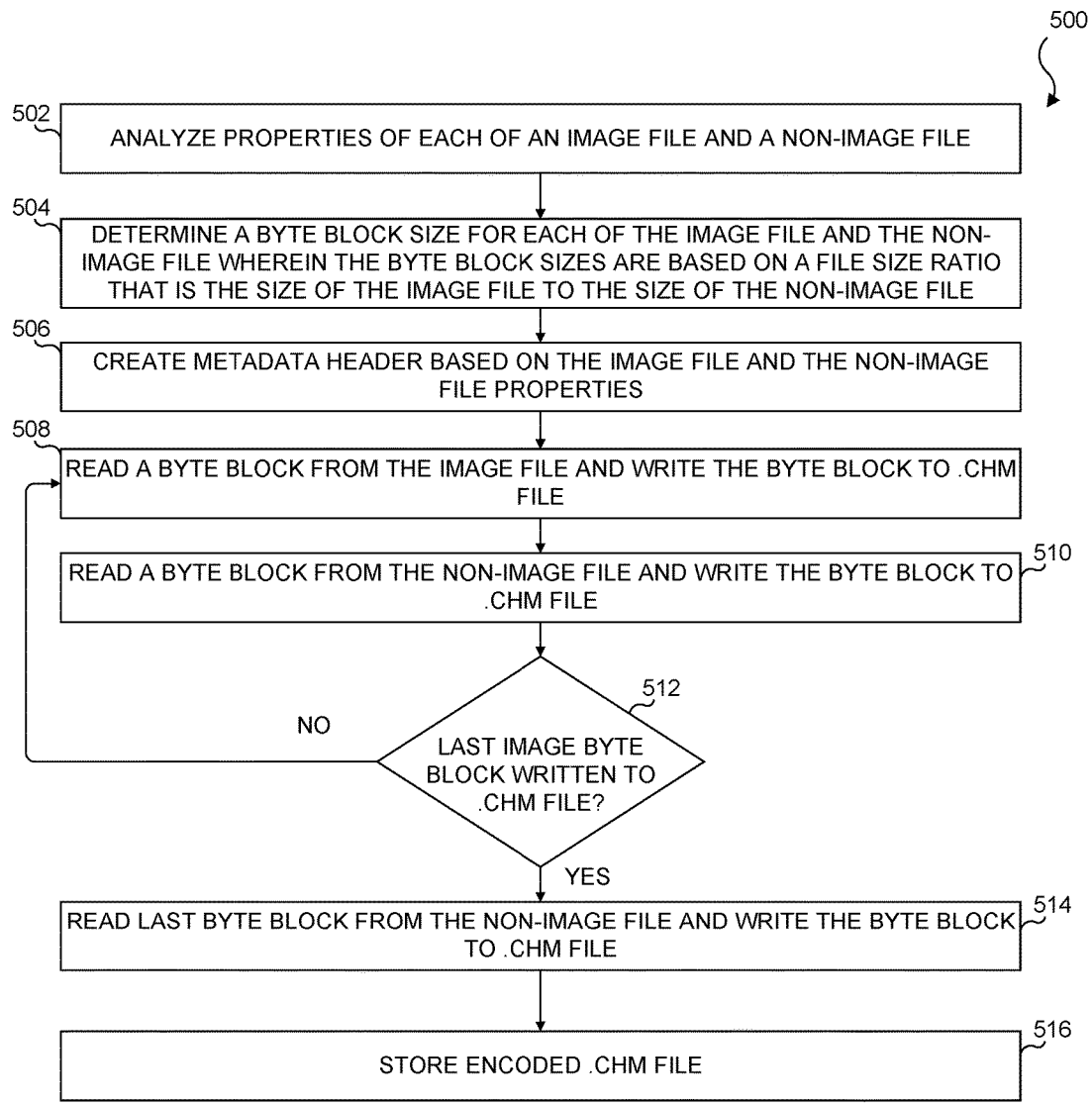
FIG. 5 illustrates a flowchart of a CHM creation process in accordance with various embodiments of the present disclosure.

Referring now to FIG. 5, there is illustrated a flowchart of a CHM creation process 500 in accordance with various embodiments of the present disclosure. The process 500 begins at step 502 where an encoder or application analyzes properties of each of an image file and a non-image file. At step 504, the encoder determines an appropriate byte block size for each of the image file and the non-image file wherein the byte block sizes are based on a file size ratio that is the size of the image file to the size of the non-image file. For example, as in the example illustrated in FIG. 4, the image file 404 and the non-image file 406 both contain twenty-five bytes of data. Therefore, there is a 1:1 ratio between the image file 404 and the non-image file 406.

In the case of a 1:1 ratio, the byte block size for both the image file and the non-image file may be one byte, in order to even distribute each byte from the image file and the non-image file within the CHM file. If, for example, a 3:1 ratio existed between the number of bytes of the image file to the non-image file, three bytes would be copied from the image file and written to the CHM file for every one byte from the non-image file, or vice versa in the case of a 1:3 ratio. In the event that the number of bytes of the image file and the non-image file cannot be expressed easily as a ratio, other methods for determining the byte block size may be performed, as described herein.

After the byte block size for the image file and for the non-image file is determined, the process flows to step 506. At step 506, the encoder creates a metadata header for a new CHM file based on the image file and non-image file properties. The metadata header may also include information concerning the byte block size of each of the image file and the non-image file, so that a decoder may use the metadata header information at a later time to determine how the CHM file should be decoded. At step 508, the encoder reads a byte block from the image file and writes the byte block to a body section of the new CHM file. At step 510, the encoder reads a byte block from the non-image file and writes the byte block to the CHM file. The process 500 flows to decision block 512, where it is determined whether the last image file byte block has been written to the CHM file. If not, the process flows back to step 508 to write another byte block from the image file, to write another non-image file byte block at step 510, and return to decision block 512 to again determine whether the last image file byte block has been written to the CHM file. If at decision block 512 it is determined that the last byte block has been written to the CHM file, the process 500 flows to step 514 to read the last byte block from the non-image file and write the byte block to the CHM file. The process 500 ends with step 516, where the encoded CHM file is stored.

Figure 6:
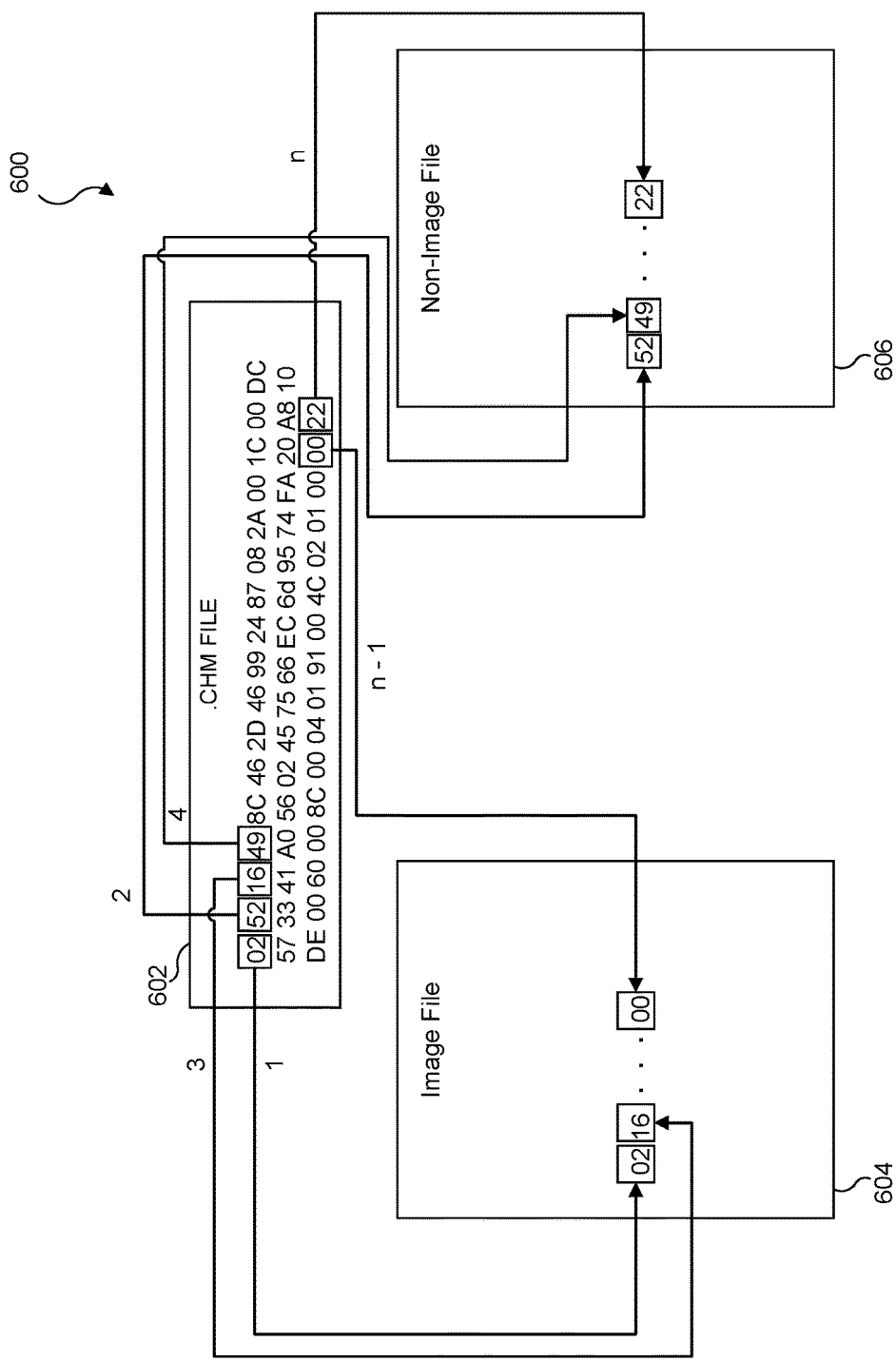
FIG. 6 illustrates a diagrammatic view of one embodiment of a CHM file decoding process in accordance with various embodiments of the present disclosure.

Referring now to FIG. 6, there is illustrated a diagrammatic view of one embodiment of a CHM file decoding process 600 in accordance with various embodiments of the present disclosure. A CHM file 602 may include a plurality of bytes blended into the CHM file previously during a CHM encoding operation. The plurality of bytes in the CHM file 602 is shown in FIG. 6 as what may be the final result of the encoding process illustrated in FIG. 4, with the plurality of bytes in the CHM file 602 including all the bytes from the image file 404 and the non-image file 406. To decode the CHM file and recreate an image file 604 and a non-image file 606, a decoder may determine the byte block size used to create the CHM file 602 and begin reading and writing byte blocks from the CHM file 602 to the image file 604 and the non-image file 606.

At a first step 1, the decoder reads a first byte "02" from the CHM file 602 and writes the first byte "02" to the image file 604 as the first byte of the image file 604. At a second step 2, the decoder reads a second byte "52" from the CHM file 602 and writes the second byte "52" to the non-image file 606 as the first byte of the non-image file 606. At a third step 3, the decoder reads a third byte "16" from the CHM file 602 and writes the third byte "16" to the image file as the second byte of the image file 604. At a fourth step 4, the decoder reads a fourth byte "49" from the CHM file 602 and writes the fourth byte "49" as the second byte of the non-image file 606. This pattern continues until all bytes from the CHM file are read and written to the image file 604 and the non-image file 606. At a penultimate step n−1, the decoder writes a penultimate byte "00" to the image file 604 as the last byte of the image file 604. At a last step n, the decoder writes a last byte "22" to the non-image file as the last byte of the non-image file 606. After step n, the image file 604 and the non-image file 606 are completed. The image file 604 and the non-image file 606 may be exact copies of the image file and non-image file that were used during creation and encoding of the CHM file 602, such as the image file 404 and non-image file 406.

Figure 7:
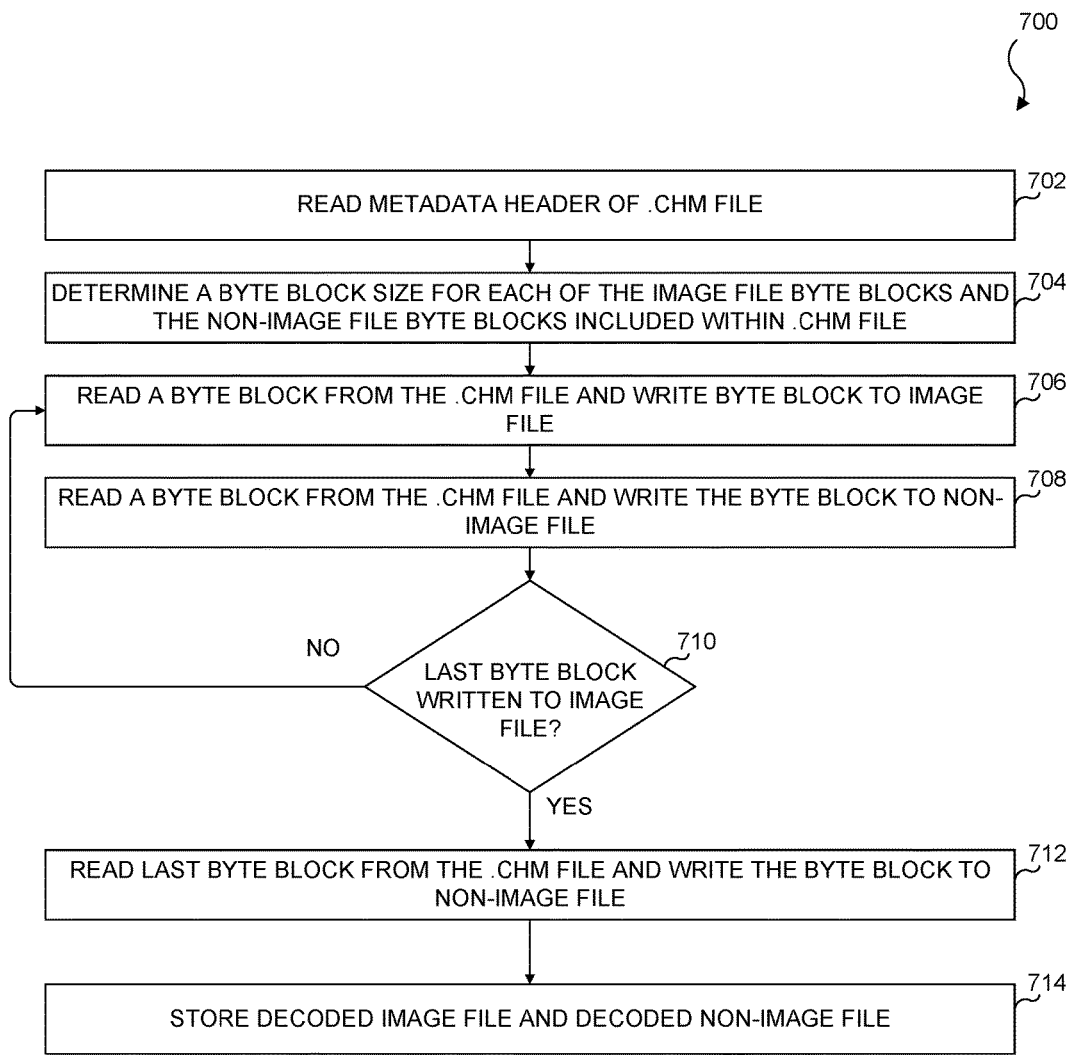
FIG. 7 illustrates a CHM decoding process in accordance with various embodiments of the present disclosure.

Referring now to FIG. 7, there is illustrated a CHM decoding process 700 in accordance with various embodiments of the present disclosure. The process 700 begins at step 702 where a decoder reads a metadata header of a CHM file. The metadata header may contain information related to the original data streams used to create the CHM file, such as byte block sizes for the files. At step 704, the decoder determines a byte block size for each of the image file byte blocks the non-image file byte blocks included within the CHM file. At step 706, the decoder reads a byte block from the CHM file and writes the byte block to an image file. At step 708, the decoder reads a byte block from the CHM file and writes the byte block to a non-image file. At decision block 710, the decoder determines whether the last byte block has been written to the image file. If not, the process flows back to step 706 and the decoder reads the next image file byte block from the CHM file and writes the byte block to the image file, and then moves to step 708 again to read the next non-image byte block from the CHM file and write the byte block to the non-image file.

If at decision block 710, it is determined that the last image file byte block has not been written to the image file, the process flows to step 712 where the decoder reads a last byte block from the CHM file and writes the byte block to the non-image file. After step 712, the image file and the non-image file are completed. The image file and the non-image file may be exact copies of the image file and non-image file that were used during creation and encoding of the CHM file. The process 700 ends with step 714 where the decoded image file and the decoded non-image file are stored.

Figure 8:
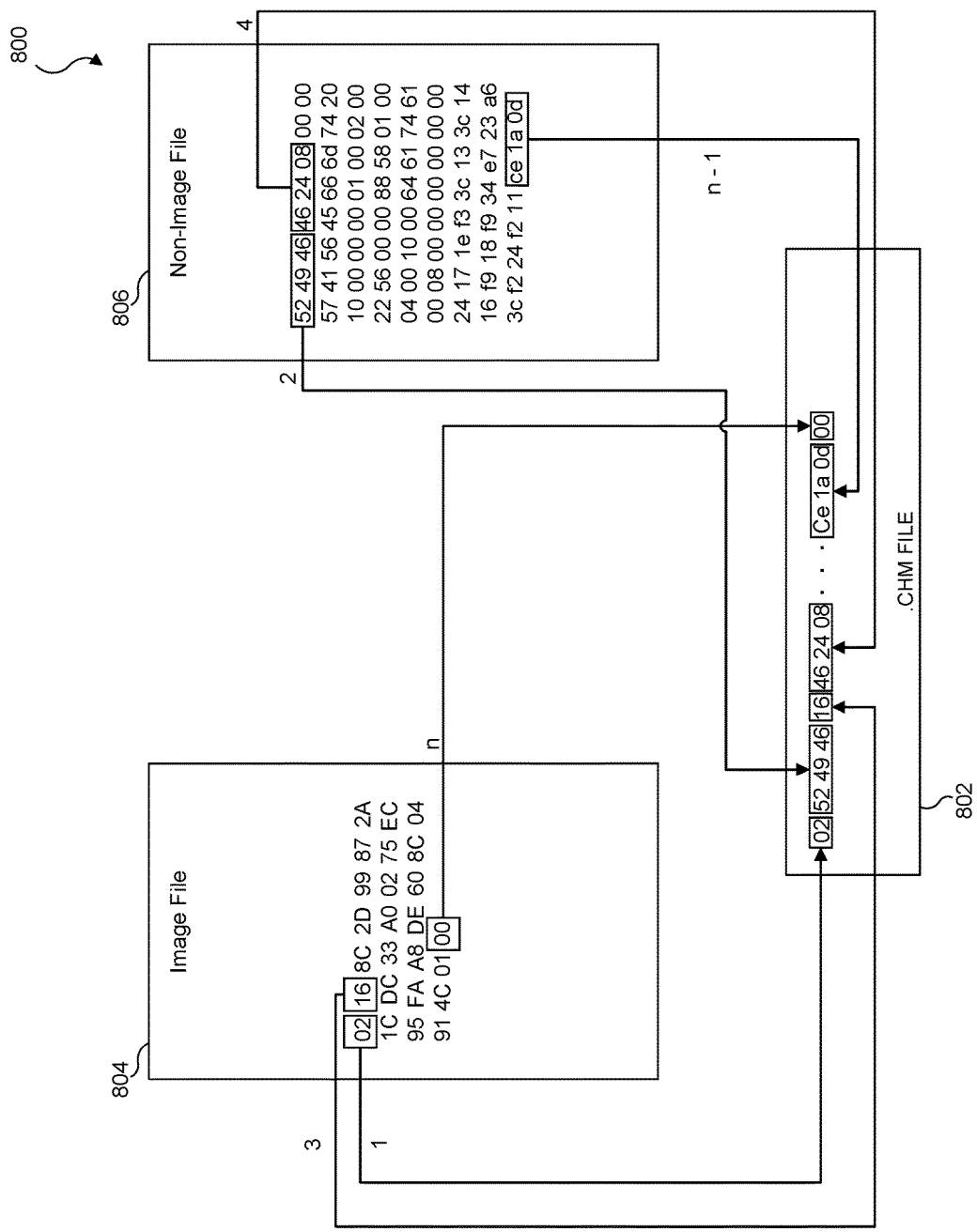
FIG. 8 illustrates a diagrammatic view of an embodiment of a CHM file encoding process where the files to be blended into a CHM file do not have an equal number of bytes, in accordance with various embodiments of the present disclosure.

Referring now to FIG. 8, there is illustrated a diagrammatic view of an embodiment of a CHM file encoding process 800 where the files to be blended into a CHM file 802 do not have an equal number of bytes, in accordance with various embodiments of the present disclosure. FIG. 8 illustrates an image file 804 having a total of 25 bytes and a non-image file having a total of 72 bytes. The protocol for CHM encoding and decoding may call for the bytes of the files combined into the CHM file 802 to be as evenly distributed as possible. For example, the protocol may be written to avoid having multiple byte blocks of a single file be bunched together. For instance, if only one byte was written from the image file 804 and the non-image file 806 at a time, such as that illustrated in FIG. 4, the resulting CHM file would have the first 50 bytes be evenly blended from the image file 804 and the non-image file 806, but the last 47 bytes of the CHM file would all be non-image file bytes. While the protocol may allow for such an encoding algorithm, the protocol may dictate a more even distribution of bytes.

As shown in FIG. 8, the encoder determines that the byte block size for the image file 804 is one byte, while the byte block size for the non-image file 806 is three bytes. This may be determined by a mathematical operation such as $$b = \lceil \frac{y}{x} \rceil,$$

or b=ceil(y/x), where y is the number of bytes for the file having a larger number of bytes, x is the number of bytes for the file having the least number of bytes, and b is the block size for the file having the larger number of bytes. So, for example, since non-image file 806 has 72 bytes, and image file 804 has 25 bytes, b=3. If more than two files are to be written into the CHM file, this operation could be performed for every file that has more bytes than the file with the fewest bytes. For example, if another non-image file was to be blended into the CHM file 802, the block size for the non-image file 806 would still be 3 and the block size for the image file 804 would still be 1. If the other non-image file has 38 bytes, for example, b=2 for the other non-image file. The encoder would then alternate between the three files, writing a byte from the image file 804 to the CHM file, three bytes from the non-image file 806 to the CHM file, and two bytes from the other non-image file to the CHM file, until all bytes are copied to the CHM file.

As shown in FIG. 8, the encoder, at a first step 1, reads a first byte "02" from image file 804 and writes it as the first byte of the CHM file 802. At a second step 2, the encoder reads the first three bytes "52 49 46" from the non-image file 806 and writes the bytes to the CHM file 802. At a third step 3, the encoder reads a second byte "16" from the image file and writes the second byte to the CHM file 802 after the already written bytes. At a fourth step 4, the encoder reads the next three bytes in the non-image file 806 and writes the three bytes to the CHM file 802. This process of switching between the image file 804 and the non-image file 806 continues until all bytes from the image file 804 and the non-image file 806 are written to the CHM file 802. At a penultimate step n−1, the last three bytes of the non-image file 806 are written to the CHM file 802. At a last step n, the last byte of the image file 804 is written to the CHM file 802.

It should be noted that the number of bytes used as an example in FIG. 8 cause a byte block from the image file 804 to be the first and last write to the CHM file 802. It will be understood that depending on the number of bytes in the files, the algorithm may not perfectly evenly distribute byte blocks. In the example of FIG. 8, there were 25 byte block writes from the image file 804 and 24 byte block writes from the non-image file 806. However, the algorithm still distributed them in an even manner. In some embodiments, an assigned byte block size cause there to be a remainder of bytes left over. For example, if there were 125 bytes in one file and 15 bytes in another, b=9. So, there would be 15 writes from the file with 15 bytes (one byte per byte block). However, after the $13^{th}$ write for the file with 125 bytes (at 9 bytes per byte block), 117 bytes from the file would have been written into the CHM file after that $13^{th}$ write. Since there are 125 bytes in the file, there are 8 bytes remaining to be written after the $13^{th}$ write. In this scenario, for the $14^{th}$ write from the file having 125 bytes, the encoder may determine that a full byte block does not remain in the file, and simply write the last 8 bytes into the CHM file as the last byte block written from the file with 125 bytes. In other embodiments, the encoder may divide the last 8 bytes into two byte blocks of 4 bytes each, so that there is a $14^{th}$ and a $15^{th}$ read/write operation for both the file with 15 bytes and the file with 125 bytes.

In some embodiments, to limit the time spent performing read/write operations, a multiplier may be applied. For example, if the number of bytes for the files are 25 and 72, as in FIG. 8, b=3, and the encoder may write one byte at a time for the image file 804 and three bytes at a time for the non-image file 806. However, this causes there to be a total of 49 read/write operations. A multiplier may be applied to decrease the number of read/write operations, which may be useful in speeding up the process and limiting strain on resources, especially for files having a large number of bytes. For example, a 2× multiplier may be applied, increasing the byte block size for the image file 804 to 2, and the byte block size for the non-image file 806 to 6. Thus, the encoding process would only require twenty-five read/write operations (including any extra writes for remainders).

Figure 9A:
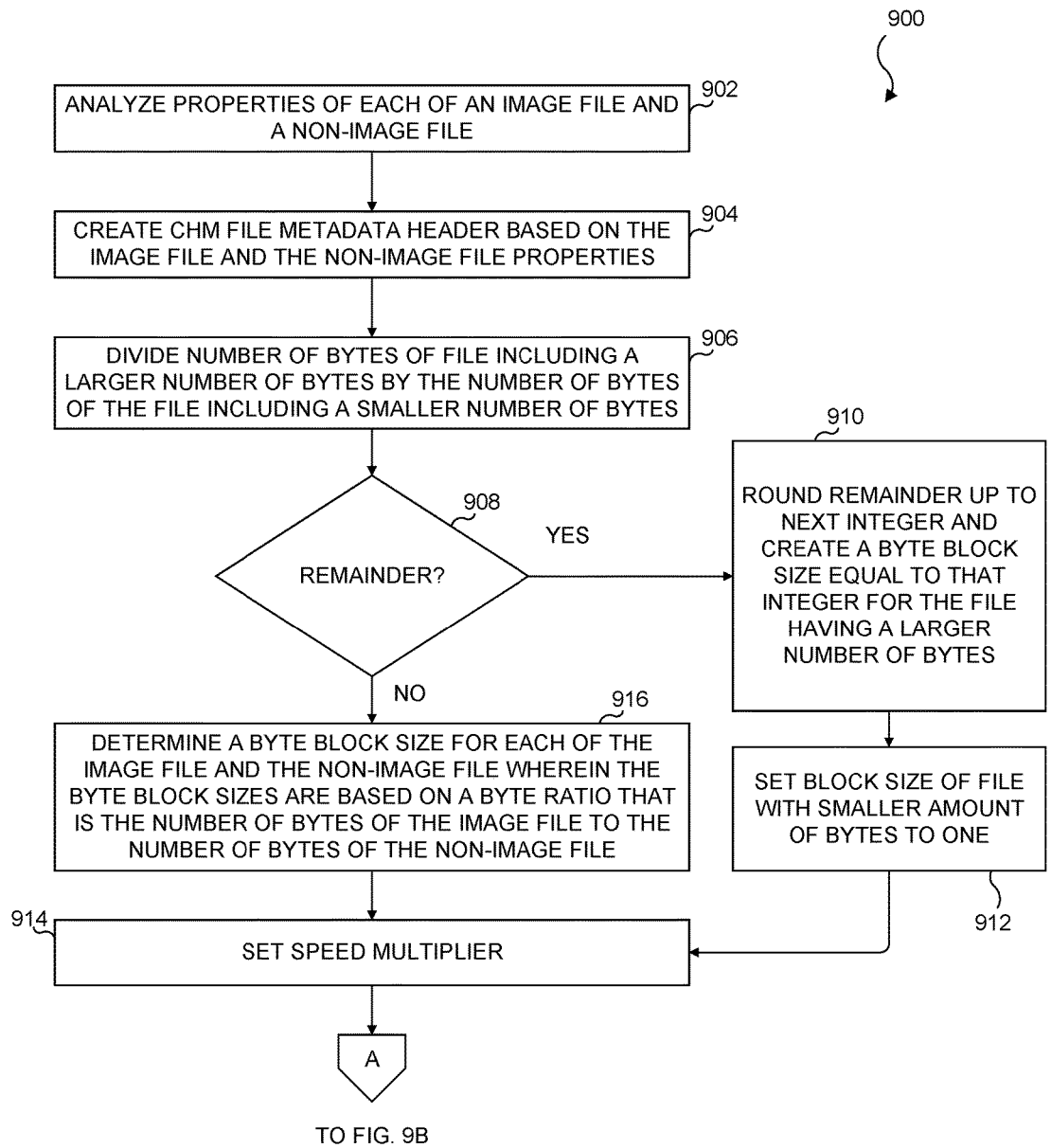
FIGS. 9A and 9B illustrate a flowchart of a CHM encoding process in accordance with various embodiments of the present disclosure.
Figure 9B:
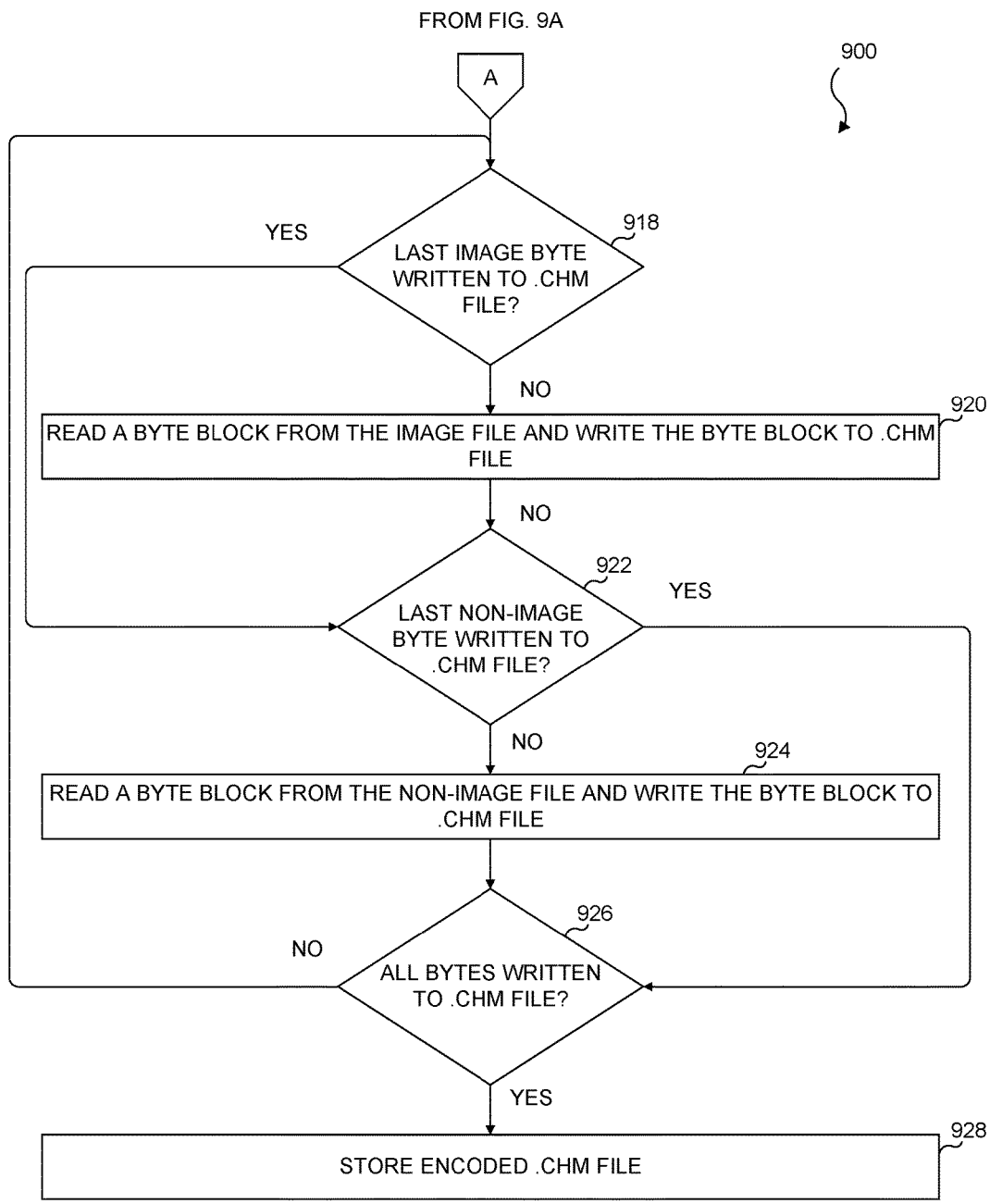

Referring now to FIGS. 9A and 9B, there is illustrated a flowchart of a CHM encoder process 900 in accordance with various embodiments of the present disclosure. The process begins at step 902 where an encoder analyzes the properties of each of an image file and a non-image file. It will be understood that the files may be any file type or combinations of file types, and that use of an image file and non-image file is just for example purposes. At step 904, the encoder creates a metadata header using information found during step 902 concerning the image file and the non-image file. At step 906, the encoder divides the number of bytes of the file that has a larger number of bytes by the number of bytes of the file that has a smaller number of bytes. At decision block 908, it is determined whether the division performed in step 906 results in a number having a remainder. If so, the process 900 flows to step 910 where the result of the division in step 906 is rounded up to the next integer (2.5 to 3, for example) and a byte block size that is equal to that integer is assigned for the file having a larger number of bytes. Steps 906-910 may be practically in the encoder program by performing a ceil( ) function or by performing integer division and adding one to the result. At step 912, the byte block size for the smaller file is set to one. The process then flows to step 914.

If at decision block 908 it is determined there is no remainder, the process flows to step 916 where the byte block sizes for the image file is set based on a ratio of the number of bytes of the image file to the number of bytes of the non-image file. For example, if the image file has 18 bytes and the non-image file has 27 bytes, the ratio is 2:3, so the encoder would assign a byte block size of 2 to the image file and a byte block size of 3 to the non-image file. The process then flows to step 914. At step 914, a speed multiplier is set such as described herein, to optionally speed up the encoding process and reduce the number of read/write operations. If not needed, the speed multiplier can be set to 1 to keep the assigned byte block sizes.

The process 900 then flows to decision block 918, where it is determined whether the last image file byte block has been written to the CHM file. If not, the process 900 flows to step 920. At step 920, the encoder reads a byte block from the image file and writes the byte block to the CHM file. At decision block 922, it is determined whether the last non-image file byte has been written to the CHM file. If not, the process 900 flows to step 924. At step 924, the encoder reads a byte block from the non-image file and writes the byte block to the CHM file. At decision block 926, it is determined whether all bytes from both the image and the non-image file have been written to the CHM file. If not, the process 900 flows back to decision block 918. If at decision block 918 it is determined that the last image file byte has been written to the CHM file, the process flows to decision block 922. If at decision block 922 it is determined that the last non-image file byte has been written to the CHM filed, the process flows to decision block 926. If at decision block 926 it is determined that all bytes have been written, the process flows to step 928. At step 928, the encoded CHM filed is stored.

Figure 10:
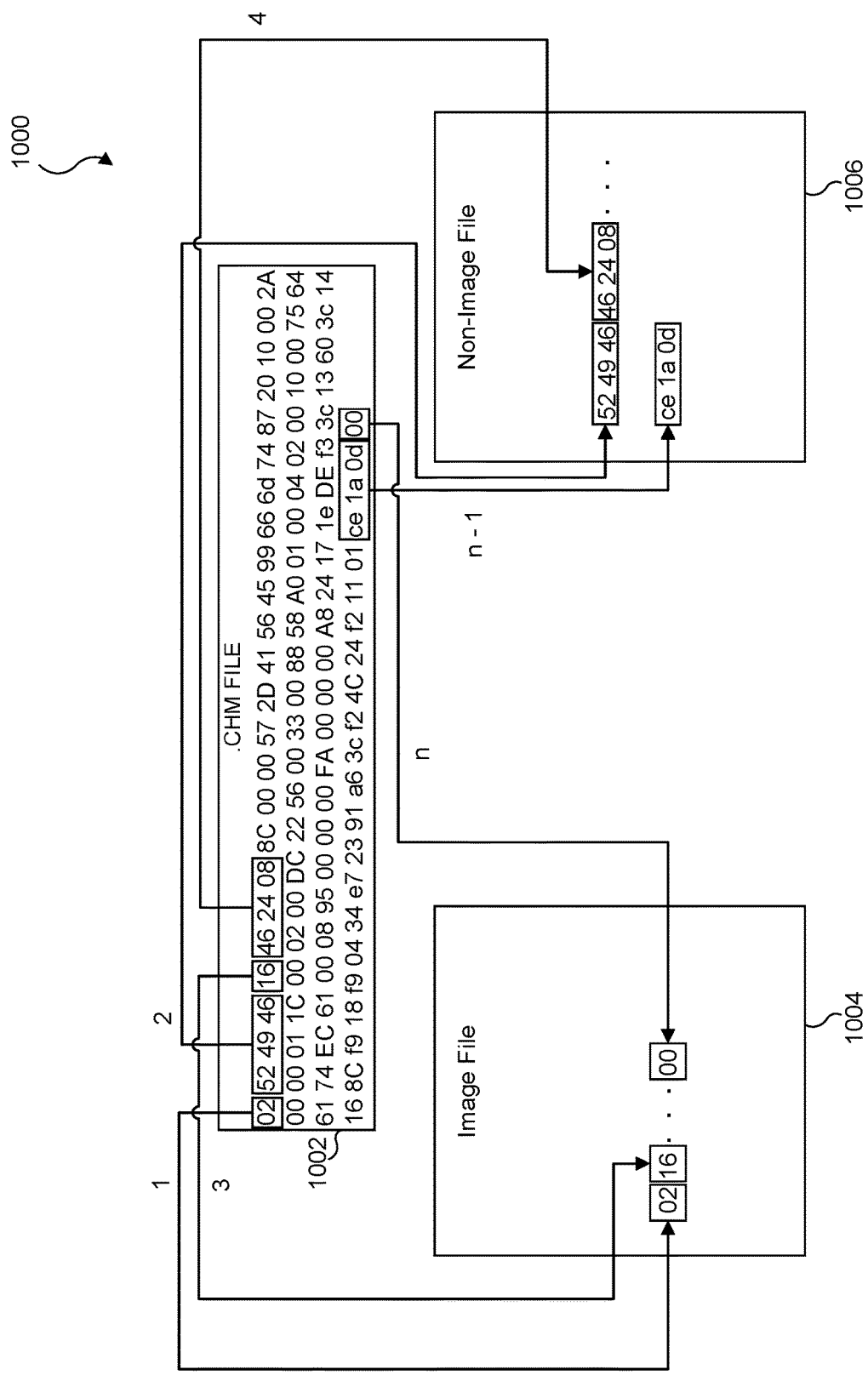
FIG. 10 illustrates a diagrammatic view of an embodiment of a CHM file decoding process where the files to be decoded from a CHM file do not have an equal number of bytes, in accordance with various embodiments of the present disclosure.

Referring now to FIG. 10, there is illustrated a diagrammatic view of an embodiment of a CHM file decoding process 1000 where the files to be decoded from a CHM file 1002 do not have an equal number of bytes, in accordance with various embodiments of the present disclosure. The header data of the CHM file may indicate how the CHM file 1002 was created, and the byte block sizes used for the files making up the CHM file 1002. The example shown in FIG. 10 is a decoding process of the CHM file illustrated in FIG. 8. At a first step 1, a first byte "02" is read from the CHM file 1002 and written to an image file 1004. At a second step 2, three bytes "52 49 46" are read from the CHM file 1002 and written to a non-image file 1006. At a third step 3, a byte "16" is read from the CHM file 1002 and written to the image file 1004. At a fourth step 4, three bytes "46 24 08" are read from the CHM file 1002 and written to the non-image file 1006. The process 1000 continues alternating writing one byte to the image file 1004 and writing three bytes to the non-image file 1006 in order to write all bytes from the CHM file 1002. At a penultimate step n−1, the first three bytes "ce 1a 0d" of the last four bytes of the CHM file are written to the non-image file 1006. At a last step n, the last byte "00" of the CHM file is written to the image file 1004. After step n, the image file 1004 and the non-image file 1006 are completed. The image file 1004 and the non-image file 1006 may be exact copies of the image file and non-image file that were used during creation and encoding of the CHM file 802, such as the image file 804 and non-image file 806.

Figure 11:
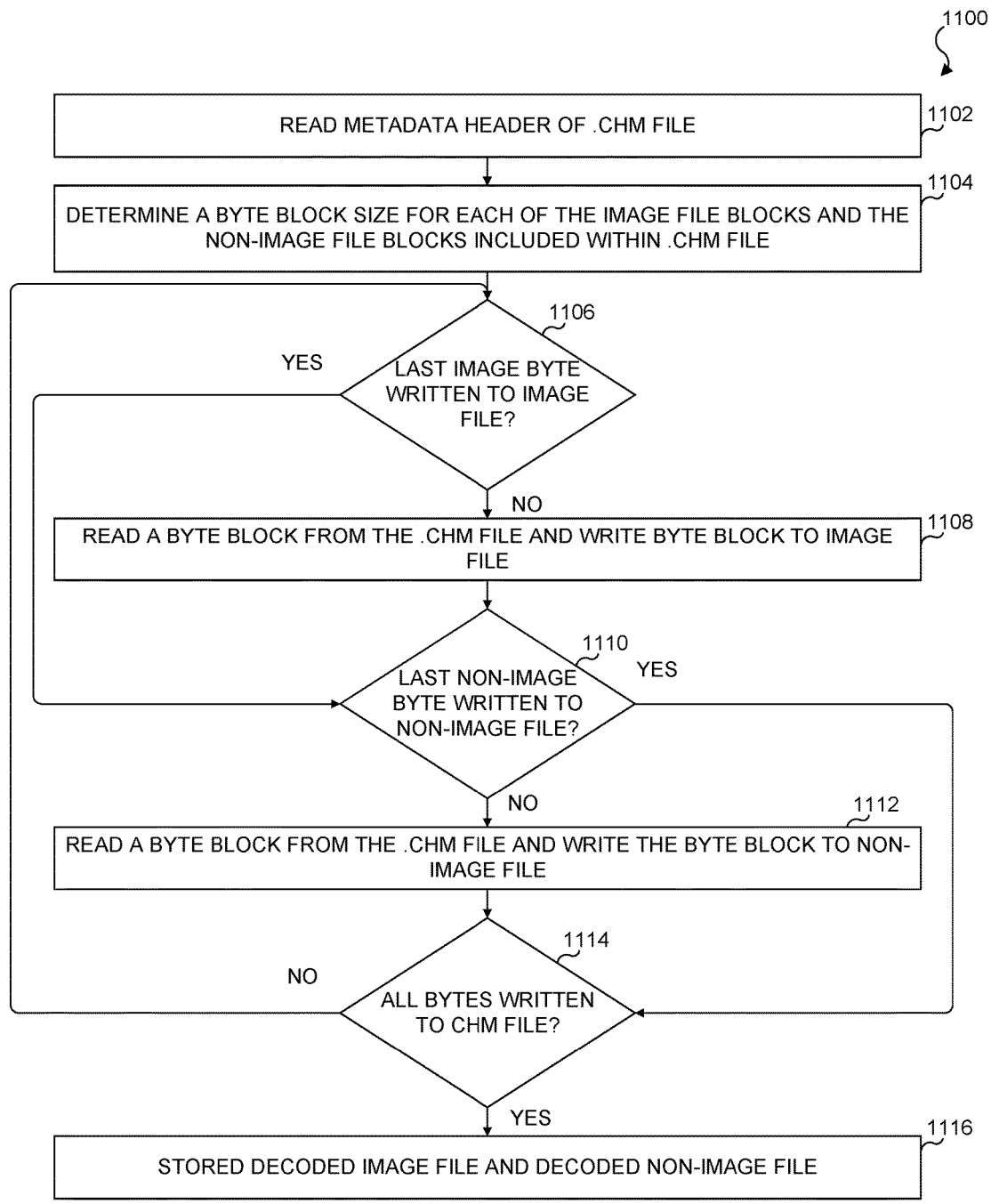
FIG. 11 illustrates a flowchart of a CHM decoding process in accordance with various embodiments of the present disclosure.

Referring now to FIG. 11, there is illustrated a flowchart of a CHM decoding process 1100 in accordance with various embodiments of the present disclosure. The process 1100 begins at step 1102 where a decoder reads the metadata header of a CHM file. At step 1104, the decoder determines a byte block size for each of the image file blocks and the non-image file blocks included within the CHM file.

The process 1100 then flows to decision block 1106, where it is determined whether the last image file byte block has been written to an image file. If not, the process 1100 flows to step 1108. At step 1108, the decoder reads a byte block from the CHM file and writes the byte block to the image file. At decision block 1110, it is determined whether the last non-image file byte has been written to a non-image file. If not, the process 1100 flows to step 1112. At step 1112, the decoder reads a byte block from the CHM file and writes the byte block to the non-image file. At decision block 1114, it is determined whether all bytes from the CHM file have been written to the image file and non-image file. If not, the process 1100 flows back to decision block 1106. If at decision block 1106 it is determined that the last image file byte has been written to the image file, the process flows to decision block 1110. If at decision block 1110 it is determined that the last non-image file byte has been written to the non-image file, the process flows to decision block 1114. If at decision block 1114 it is determined that all bytes have been written to the CHM file, the process flows to step 1116. At step 1116, the decoded image and non-image files are stored.

Figure 12:
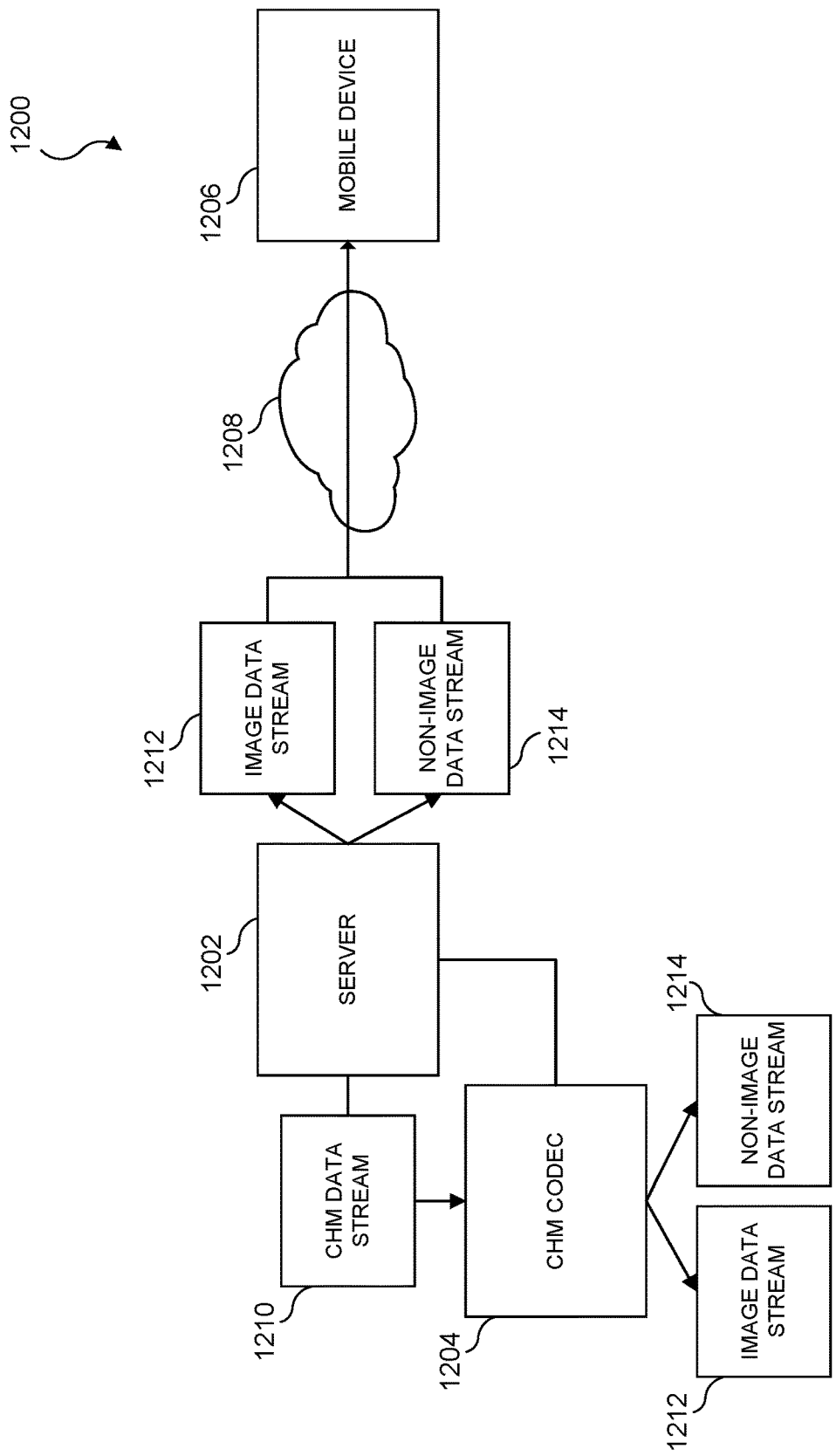
FIG. 12 illustrates a diagrammatic view of a server-side CHM file decoding and transmission system in accordance with various embodiments of the present disclosure.

Referring now to FIG. 12, there is illustrated a diagrammatic view of a server-side CHM file decoding and transmission system 1200 in accordance with various embodiments of the present disclosure. The system 1200 includes a server 1202 that includes a CHM codec 1204. The CHM codec 1204 may be a program for encoding and/or decoding CMH files or data streams. The server 1202 may receive a request from a mobile device 1206, the request being sent over a network 1208. The server may have a CHM file stored thereon. The server 1202 may be a web server configured to present the CHM file as part of a webpage. For instance, the webpage may be an online store page for a product. The CHM file may be used to store an images or images of the product and accompanying audio to describe the product, as well as other file types and information. When the webpage loads on the mobile device 1206, a user of the mobile device 1206 may view images of the product and hear audio describing the product. It will be understood that this is but one example, and the systems and processes described herein may be used to present images and accompanying audio in other scenarios as well.

In some embodiments, the server 1202 may decode the CHM file before sending the separate files or data streams over the network 1208 to the mobile device 1206. This allows for the webpage and the contents of the CHM file to be viewed or accessed without the mobile device 1206 requiring a CHM codec or browser plugin to decode the CHM file. In other embodiments, the mobile device 1206 may include such a codec or plugin, in which case the server may transmit the CHM file to the mobile device 1206, and the mobile device 1206 would perform a decoding process on the CHM file. As shown in FIG. 12, the server 1202 provides a CHM data stream 1210 to the CHM codec 1204, the CHM data stream 1210 being a stream from the CHM file stored on the server. The CHM codec 1204 decodes the CHM data stream 1210 into separate files or data streams that were originally used during creation of the CHM file. As one example, and as illustrated in FIG. 12, the CHM codec 1204 may decode the CHM data stream 1210 into a separate image data stream 1212 and a separate non-image data stream 1214. The server 1202 may then transmit the image data stream 1212 and the non-image data stream 1214 over the network 1208 to the mobile device 1206, for use by the mobile device.

Figure 13:
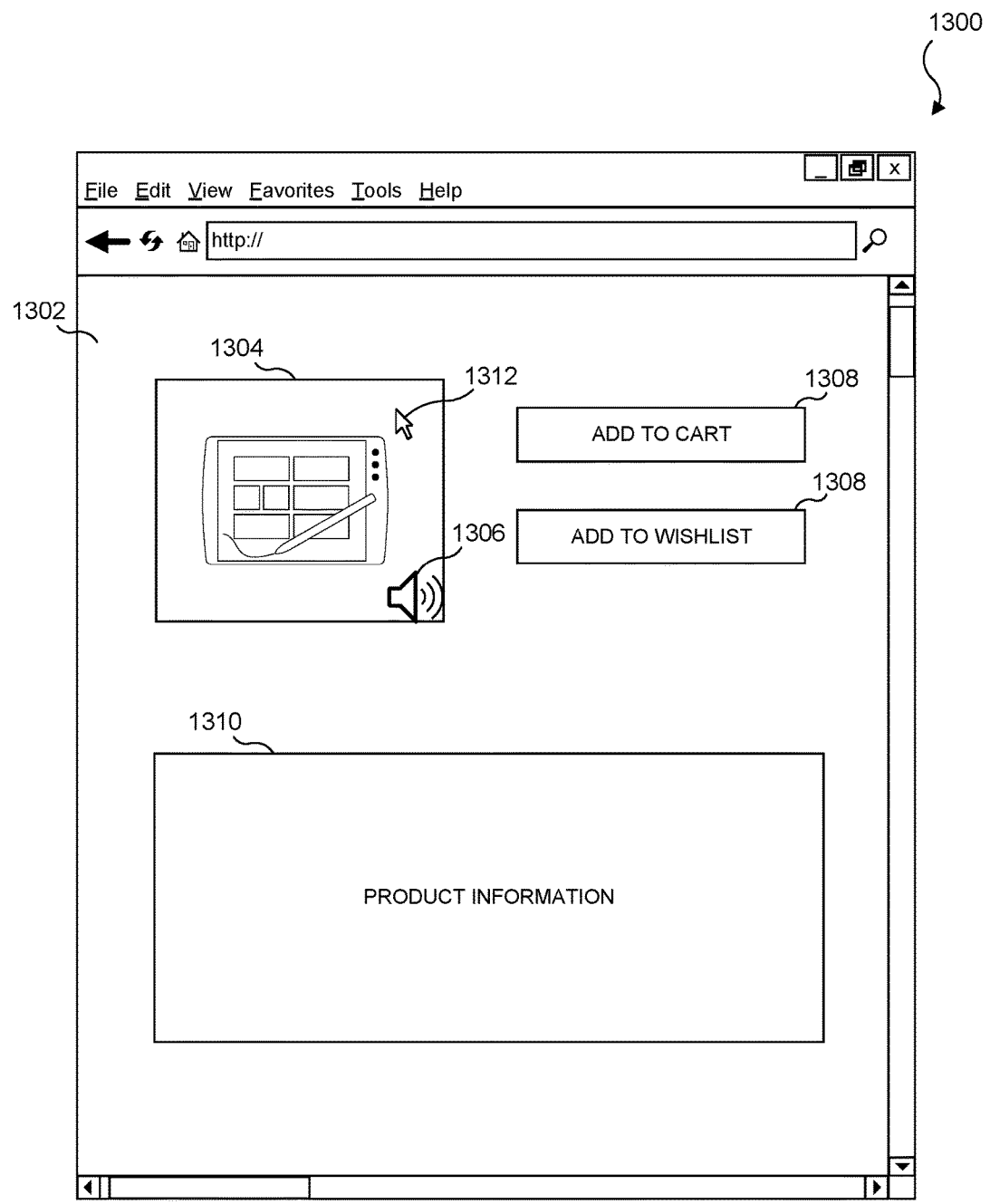
FIG. 13 illustrates a browser window showing a webpage including an image with accompanying audio presented on the webpage, in accordance with various embodiments of the present disclosure.

Referring now to FIG. 13, there is illustrated a browser window 1300 showing a webpage 1302 including an image 1304 with accompanying audio 1306 presented on the webpage 1302, in accordance with various embodiments of the present disclosure. As described with respect to FIG. 12, a CHM file may be received by a device on which a browser or other means of accessing web content resides. A server may decode a stored CHM file and then transmit the separate streams to the device, the separate streams providing content to be presented on the webpage 1302. Once the webpage 1302 is loaded in the browser window 1300 the image 1304 and other webpage content such as user interaction buttons 1308 and textual product information 1310 may be presented. The audio 1306 may begin playing once the website is loaded, or the audio 1306 may only play upon a trigger instructing the audio 1306 to play. For example, the audio 1306 may only play when a mouse cursor 1312 is placed over the image 1304, when the image 1304 is clicked on, or when the image 1304 is scrolled such that the image 1304 is viewable in the browser window 1300, with the audio 1306 stopping once the user scrolls away from the image 1304.

Presenting audio with an image in this way offers a more efficient means of providing audio information with an image. Typically, if one wishes to provide image content in association with audio content, one would create a video file, such as an MP4 file, and lay an audio track over the image. This may be an inefficient method of associating audio content with an image because if the goal is to provide audio content with one or more still images, rather than with moving video content, creating a video file to achieve such creates a bigger file than needed, as video files are commonly much larger than an image or an audio file, even when the image or audio file sizes are combined. The CHM file is the same or a similar size to the combined size of the image and audio files, and thus provides a more efficient file type that takes up less storage, is transmitted faster, etc. It will be understood that this may be the case for other file types as well, such as if a text document was also included in the CHM file, the size of the CHM file would only increase in an amount close to that of the size of the text document.

Figure 14:
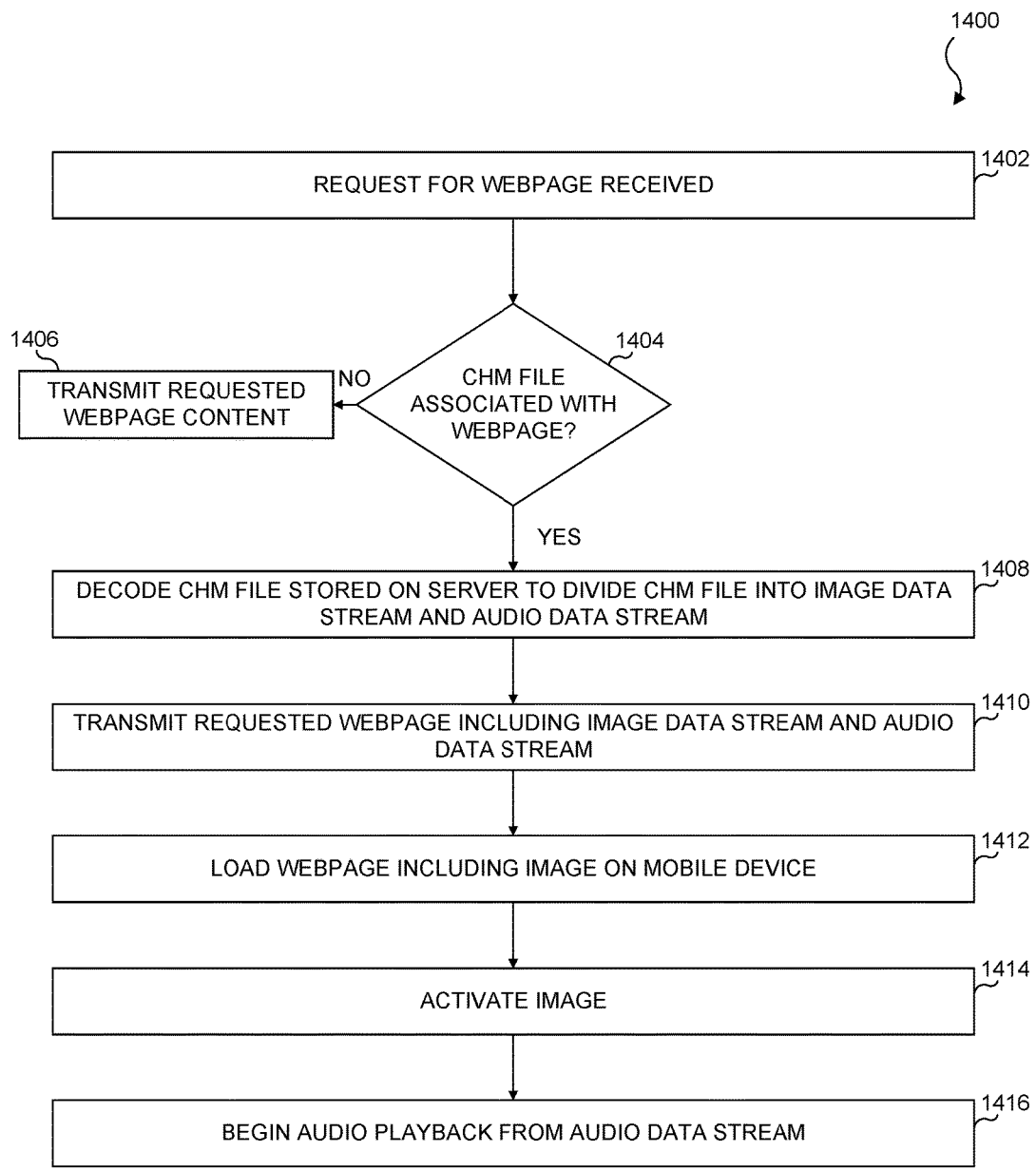
FIG. 14 illustrates a flowchart of a server-side CHM decoding process in accordance with various embodiments of the present disclosure.

Referring now to FIG. 14, there is illustrated a flowchart of a server-side CHM decoding process 1400 in accordance with various embodiments of the present disclosure. The process 1400 begins at step 1402 when the server receives a request for a webpage. At decision block 1404, it is determined whether a CHM file is associated with the requested webpage, such as if content to be loaded on the webpage is encoded within the CHM file. If not, the process 1400 ends at step 1406, where the server transmits the requested webpage content. If at decision block 1404 it is determined that there is a CHM file associated with the requested webpage, the process 1400 moves to step 1408. At step 1408, the server decodes the CHM file, or CHM files, stored on the server that is associated with the requested webpage. The decoding process divides the CHM file into separate data streams, such as an image data stream and an audio data stream.

The process 1400 then flows to step 1410, where the server transmits the requested webpage content, including the data streams separated from the CHM file, such as the image data stream and audio data stream. At step 1412, the webpage, including the separated data stream content, such as the image, is loaded on a mobile device. At step 1414, the image, now loaded as part of the webpage in a browser or other means of displaying web content, is activated. Such activation may be a tap on a touchscreen, a click, a mouse rollover, a scrolling operation that brings the image into view, or other means. At step 1416, audio playback begins from the audio data stream.

Figure 15:
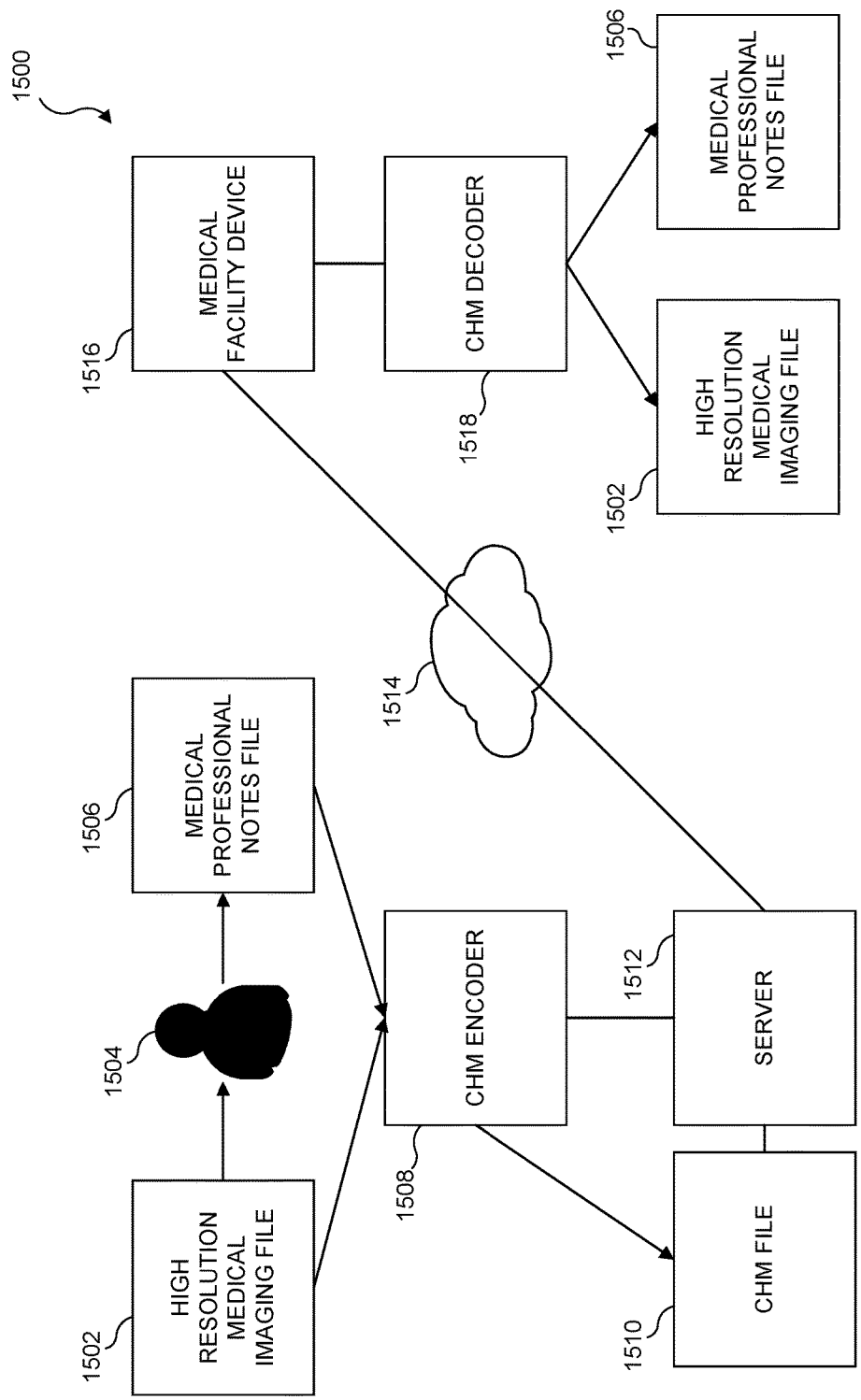
FIG. 15 illustrates a medical imaging and dictation CHM file creation system in accordance with various embodiments of the present disclosure.

Referring now to FIG. 15, there is illustrated a medical imaging and dictation CHM file creation system 1500 in accordance with various embodiments of the present disclosure. A medical imaging process (such as an MRI, X-ray, etc.) may create a high resolution medical imaging file 1502. A medical professional 1504, such as a doctor, surgeon, medical assistant, etc., may review the medical imaging file 1502 in order to provide an opinion on what is shown in the medical imaging file 1502. During such a review, the medical professional 1504 may create a notes file 1506. The notes file 1506 may be a text document including written or textual notes, the notes file 1506 may be an audio dictation where the medical professional's speech is recorded, or other means of storing the medical professional's notes. Once the notes file is created, the medical imaging file 1502 and the notes file 1506 are provided to a CHM encoder 1508. The CHM encoder 1508 may be configured to perform a CHM encoding operation only, or may include a codec for both encoding and decoding of CHM files. The CHM encoder 1508 creates a CHM file 1510, including both the medical imaging file 1502 bytes and the notes file 1506 bytes. The CHM file 1510 may be stored on a server 1512 or another device for storage, until needed at a later time.

For example, a medical facility, such as a medical specialist seeing the patient after the high resolution medical image was created, may request to see the high resolution medical imaging file 1502, along with the notes file 1506. Upon such a request, the server 1512 may transmit the CHM file 1510 over a network 1514 to a medical facility device 1516 belonging to the requesting medical facility. The medical facility device 1516 may include or be operatively connected to a CHM decoder 1518. The CHM decoder 1518 may be configured to perform a CHM decoding operation only, or may include a codec for both encoding and decoding of CHM files. Upon receiving the CHM file 1510 from the server 1512 by the medical facility device 1516, the CHM decoder 1518 may decode the CHM file 1510 to separate from the CHM file 1510 the high resolution medical imaging file 1502 and the medical professional notes file 1506. The CHM file 1510 may only be a size at or similar to the combined sizes of the high resolution medical imaging file 1502 and the notes file 1506. In some embodiments, no compression may be applied during creation of the CHM file 1510, so as to avoid in loss of image quality of the medical imaging file 1502 from a compression process. The CHM file 1510 allows for the imaging file 1502 to be transmitted and separated back out of the CHM file 1510 in its original, high resolution, state, so that another medical professional can review the image without any loss in quality. During review of the medical imaging file 1502, the notes file 1506 may be reviewed at the same time, such as listening to a dictation performed by the medical professional 1504 while viewing the imaging file 1502.

Figure 16:
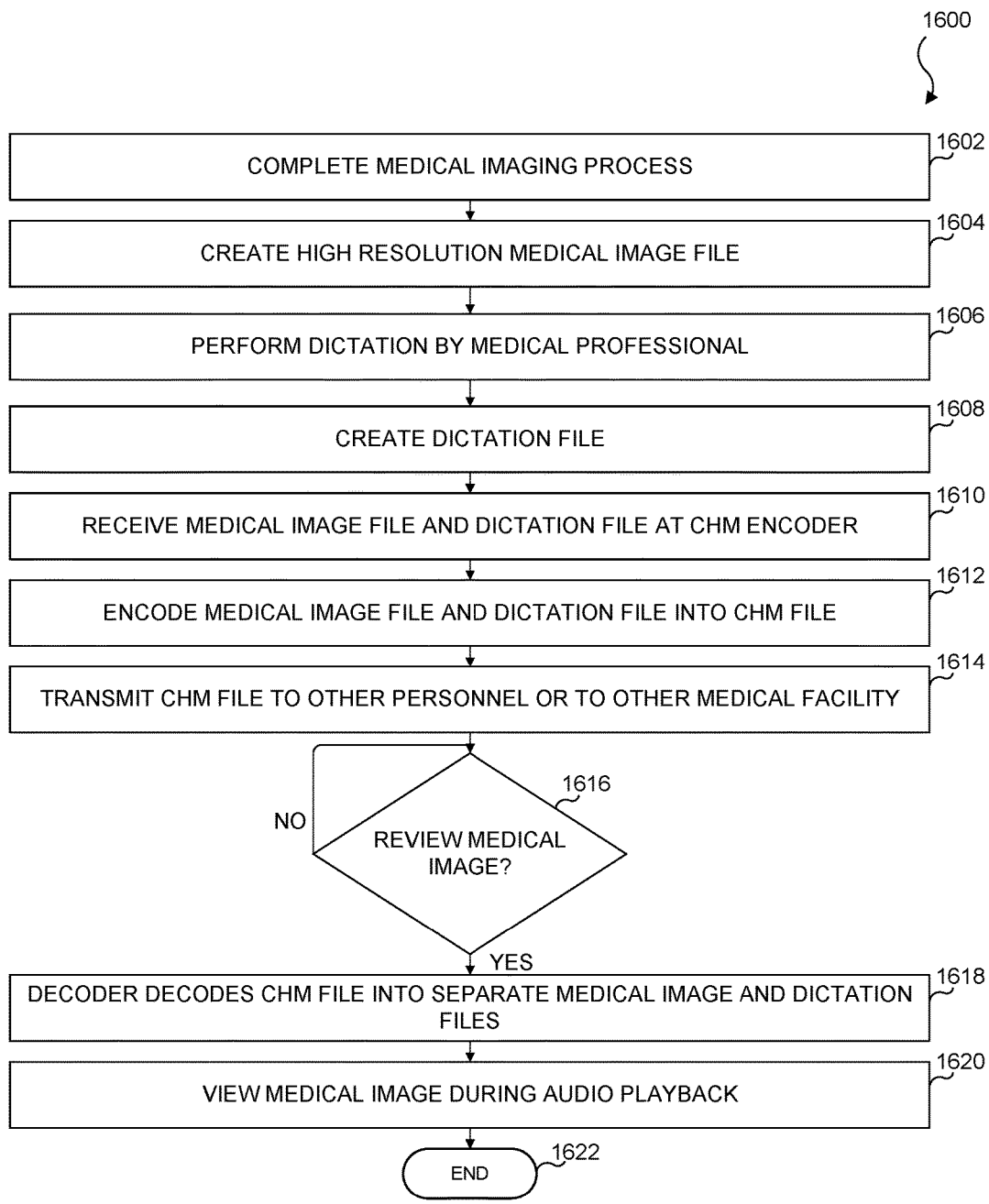
FIG. 16 illustrates a medical imaging and dictation CHM file creation process in accordance with various embodiments of the present disclosure.

Referring now to FIG. 16, there is illustrated a medical imaging and dictation CHM file creation process 1600 in accordance with various embodiments of the present disclosure. The process 1600 begins at step 1602, where a medical imaging process is completed, such as an MRI, X-ray, etc. At step 1604, a high resolution medical image file is created of a subject of the medical imaging process. At step 1606, a medical professional performs a dictation or other means of creating notes providing an analysis or opinion of what the medical professional may see in the high resolution medical image file. At step 1608, a dictation file is created to store the dictation or other notes created in step 1606.

At step 1610, a CHM encoder receives the medical image file and the dictation file. At step 1612, the CHM encoder encodes the medical image file and the dictation file into a CHM file. At decision block 1616, it is determined whether the medical image is to be reviewed, such as by a doctor or other medical professional. If not, the CHM file may be stored until such time as the image is to be reviewed. If so, the process 1600 flows to step 1618. At step 1618, a CHM decoder decodes the CHM file in order to separate the CHM file into the individual files or data streams used to create the CHM file, in this case the medical image file and the dictation file. At step 1620, the medical image file is viewed while also accessing the dictation file, such as listening to audio playback from the dictation file while viewing the medical image. The process then ends at step 1622.

A binder file may also be provided. A binder file may incorporate multiple CHM files within the binder file in order to provide file groupings defined by the CHM file. While a CHM file may include bytes from any number of files, as described herein, a binder file can be used to transmit a series of CHM files where each of the CHM files is created from a number of associated files. For instance, CHM files stored in a binder file may each include an image data stream and an audio data stream. When the binder file is accessed, the first CHM file may be decoded to present to a user the image from the first CHM file, while also playing the audio from the first CHM file. Once audio playback is complete, the next CHM file in the binder file may be decoded so that the image and audio from the next CHM file can be presented. Thus, the binder file allows for a series of images, or a presentation, to be provided to a user. The binder file may include CHM files having any types of file data streams stored therein, such as text files, document files, video files, executable files, etc., in order to provide a full suite of information and content to a user.

Figure 17:
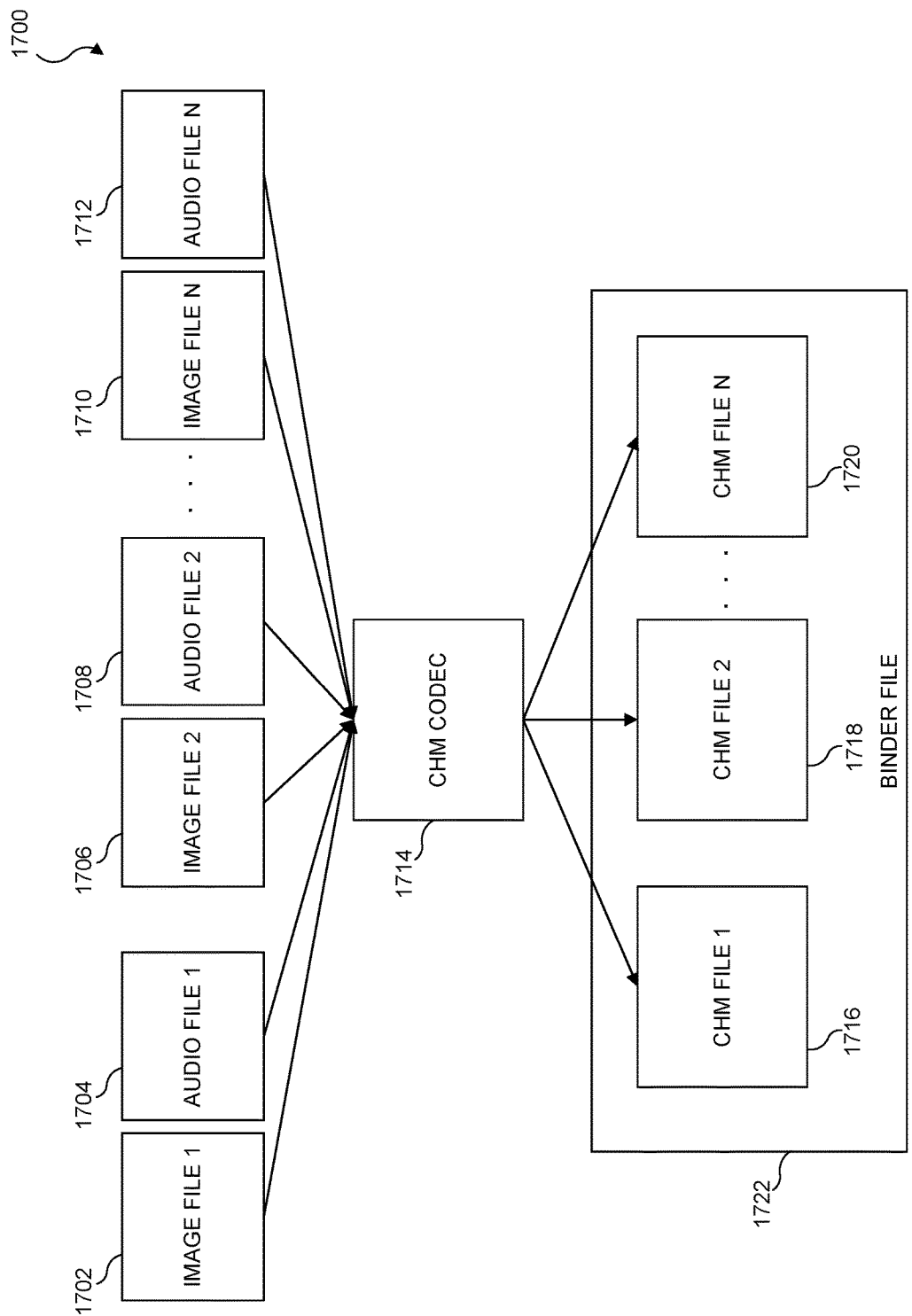
FIG. 17 illustrates a diagrammatic view of a CHM binder file creation process in accordance with various embodiments of the present disclosure.

Referring now to FIG. 17, there is illustrated a diagrammatic view of a CHM binder file creation process 1700 in accordance with various embodiments of the present disclosure. There is shown a plurality of image files associated with an audio file. A first image file 1702 is associated with a first audio file 1704, a second image file 1706 is associated with a second audio file 1708, and an $n^{th}$ image file 1710 is shown associated with an $n^{th}$ audio file 1712. The plurality of image and audio files are processed by a CHM encoder 1714 to create a plurality of CHM files, each of the plurality of CHM files created from an image file and its associated audio file. A first CHM file 1716 is created from the first image file 1702 and the first audio file 1704. A second CHM file 1718 is created from the second image file 1706 and the second audio file 1708. An nth CHM file 1720 is created from the nth image file 1710 and the nth audio file 1712. Each of the plurality of CHM files may then be stored within a binder file 1722.

Figure 18:
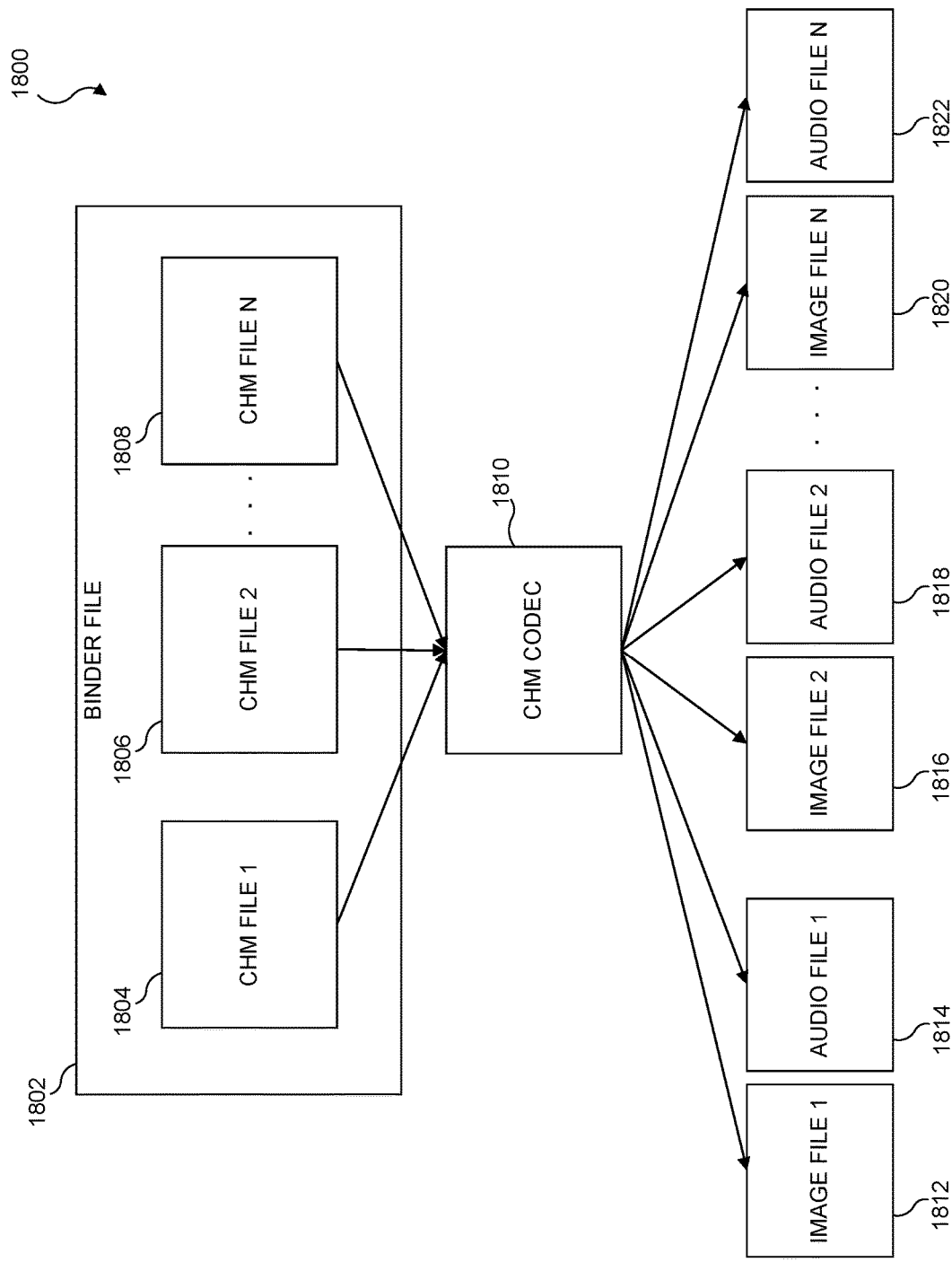
FIG. 18 illustrates a diagrammatic view of a CHM binder file decoding process in accordance with various embodiments of the present disclosure.

Referring now to FIG. 18, there is illustrated a diagrammatic view of a CHM binder file decoding process 1800 in accordance with various embodiments of the present disclosure. A binder file 1802 may include a plurality of CHM files. As illustrated in FIG. 18, the binder file 1802 includes a first CHM file 1804, a second CHM file 1806, and a nth CHM file 1808, indicating that any number of CHM files may be included in the binder file 1802. To decode and present the contents of the plurality of CHM files, the CHM files may be decoded by a CHM codec 1810, such as the decoding processes described herein. The CHM codec 1810 each of the plurality of CHM files into separate files or data streams that may be identical to the files or data streams used during the encoding process to create the CHM file. For example, decoding of the first CHM file 1804 provides a first image file 1812 and a first audio file 1814.

Once the first CHM file 1804 is decoded, audio from the first audio file 1814 may be played while the image of the first image file 1812 is presented to a user. Upon completion of playback of the first audio file 1814, or if the user performs an action that ends the audio playback or otherwise advances the process, the CHM codec 1810 may decode the second CHM file 1806 to provide a second image file 1816 and a second audio file 1818. Once the second audio file 1818 has completed playback, the CHM codec 1810 decodes the nth CHM file 1808, producing an nth image file 1820 and an nth audio file 1822. In this way, a series of content may be presented to a user.

Figure 19:
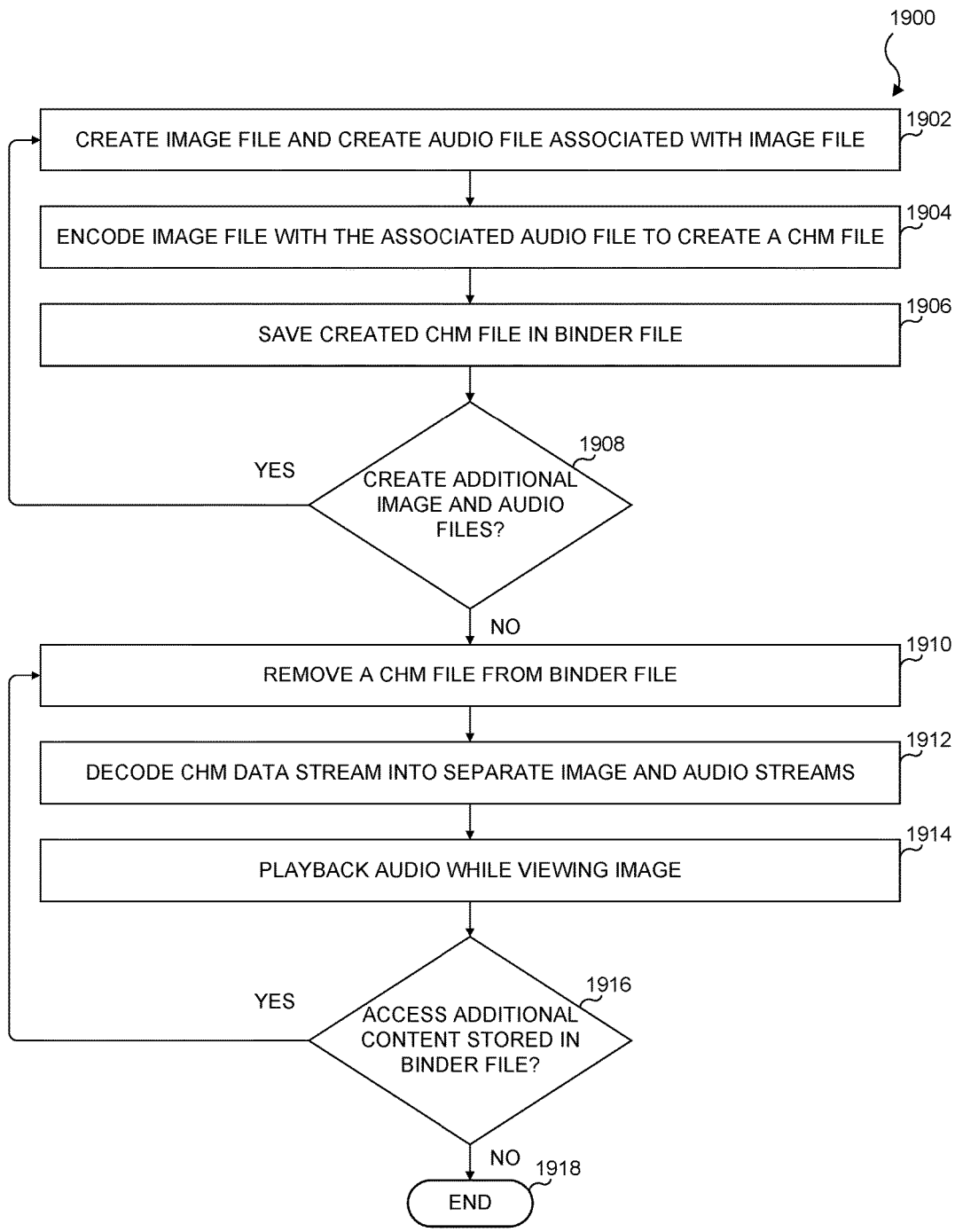
FIG. 19 illustrates a binder file creation and decoding process in accordance with various embodiments of the present disclosure.

Referring now to FIG. 19, there is illustrated a binder file creation and decoding process 1900 in accordance with various embodiments of the present disclosure. The process 1900 begins at step 1902 where an image file and an audio file associate with the image file are created. At step 1904, the image file and the associated audio file are encoded into a CHM file. At step 1906, the CHM file created in step 1904 is saved into a binder file. At decision block 1908, it is determined whether additional image and audio files are to be created. If so, the process 1900 moves back to step 1902 to create another image file and associated audio file, encode the image file and audio file into a CHM file at step 1904, and save the CHM file into a binder file. If at decision block 1908 it is determined that no additional image and audio files are to be created, and thus no more CHM files encoded and stored in the binder file, the process 1900 flows to step 1910.

At step 1910, a CHM file is removed from the binder file. At step 1912, the CHM file removed from the binder file in step 1910 is decoded into separate image and audio streams. At step 1914, audio playback from the audio data stream is performed while the image from the image data stream is presented. At decision block 1916, it is determined whether additional content stored in the binder file is to be accessed. If so, the process 1900 flows back to step 1910 to remove another CHM file from the binder file, decode the CHM data stream at step 1912, and playback audio at step 1914. If at decision block 1916 it is determined that no additional content is to be accessed, the process 1900 ends at end block 1918.

Figure 20:
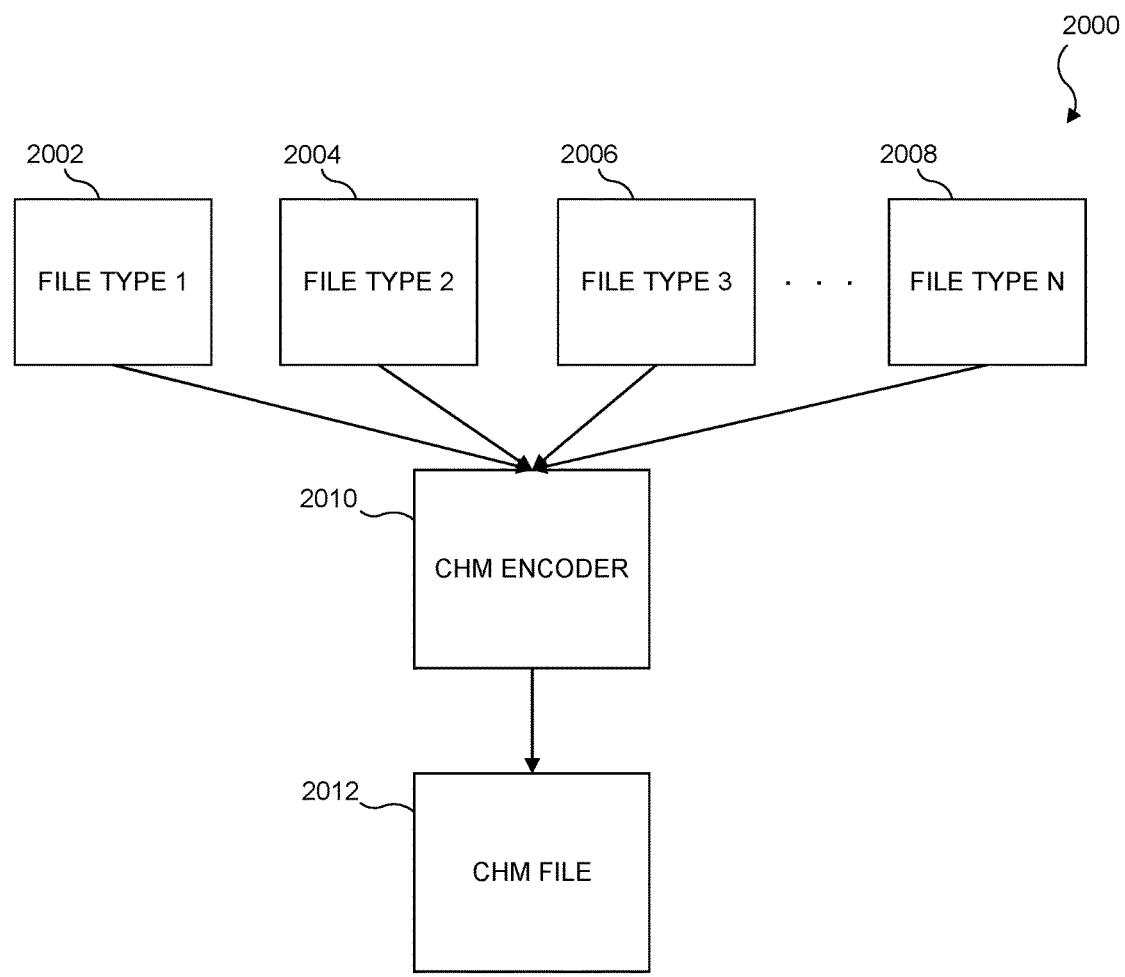
FIG. 20 illustrates a diagrammatic view of a CHM file encoding process wherein files of multiple file types are encoded in accordance with various embodiments of the present disclosure.

Referring now to FIG. 20, there is illustrated a diagrammatic view of a CHM file encoding process 2000 wherein files of multiple file types are encoded in accordance with various embodiments of the present disclosure. A CHM file may include the bytes of any number of files of various file types blended into the CHM file and later decoded out of the CHM file. FIG. 20 illustrates a plurality of files each having a file type being encoded into a single CHM file. There is shown a file of a first file type 2002, a file of a second file type 2004, a file of a third file type 2006, and a file of an nth file type 2008, indicating that there may be any number of files, each having a different file type. It will be understood that multiple files of the same file type may also be included, such as including three image files, two audio files, and four text documents, for example. The plurality of files may be sent to a CHM encoder 2010. The CHM encoder 2010 encodes all of the plurality of files into a CHM file 2012. The encoding process may be performed in as described herein to evenly distribute the bytes of each of the files within the CHM file 2012.

Figure 21:
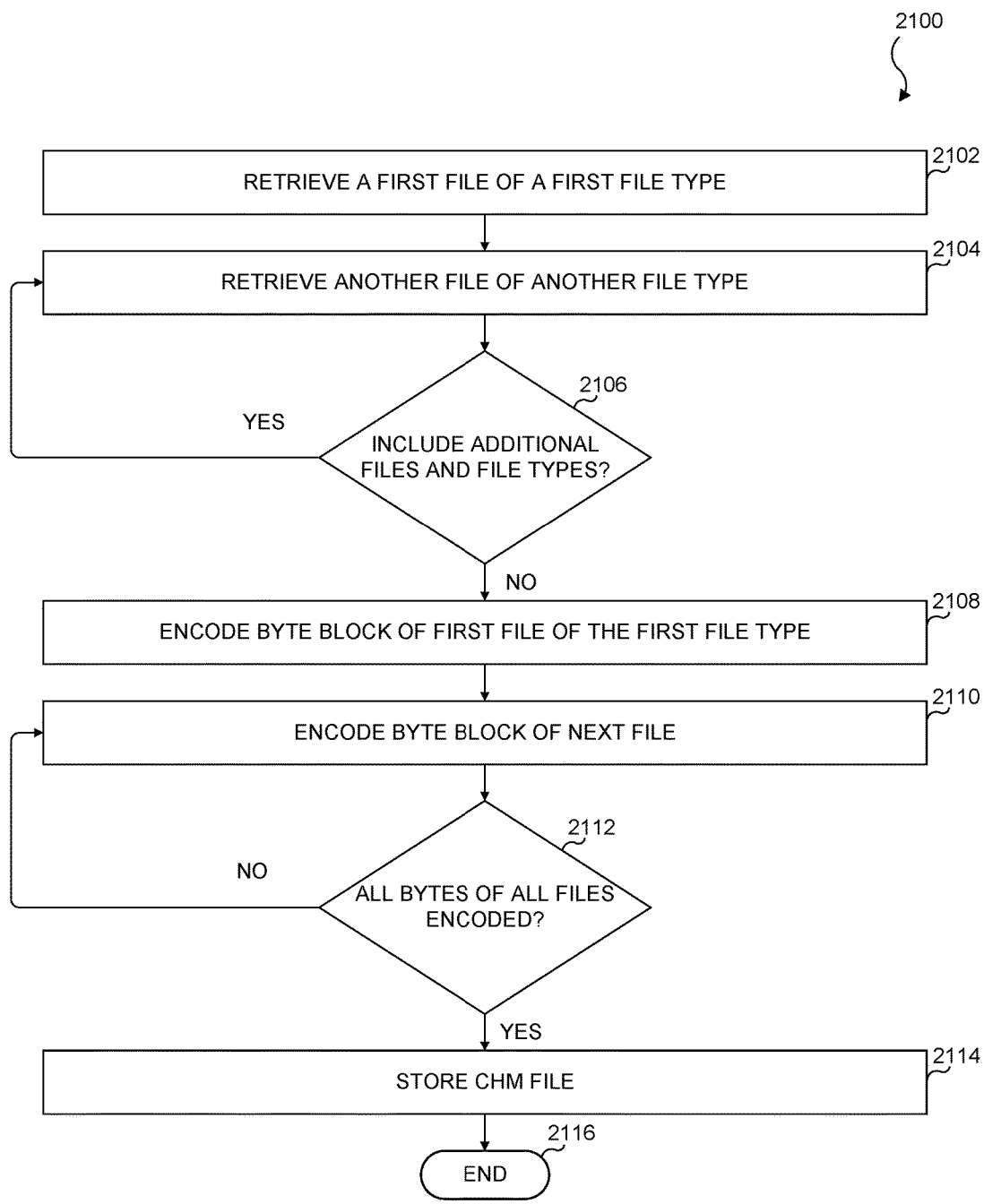
FIG. 21 illustrates a flowchart of a CHM file encoding process wherein files of multiple file types are encoded in accordance with various embodiments of the present disclosure.

Referring now to FIG. 21, there is illustrated a flowchart of a CHM file encoding process 2100 wherein files of multiple file types are encoded in accordance with various embodiments of the present disclosure. The process 2100 begins at step 2102, where a first file of a first file type is retrieved. At step 2104, another file of another file type is retrieved. At decision block 2106, it is determined whether additional files and files of other types are to be included in the encoding process. If so, the process moves back to step 2104 to retrieve another file. If at decision block 2106 it is determined that no additional files or file types are to be included in the encoding process, the process flows to step 2108. At step 2108, a byte block of the first file of the first file type is encoded. At step 2110, a byte block of the next file retrieved is encoded. At decision block 2112, it is determined whether all byte of all files have been encoded. If not, the process 2100 moves back to step 2110 to encode the next byte block. In step 2110, the "next" file may be a file that the encoding process returns to in order to write the next byte block from that file. For instance, if the process 2100 is encoding three files into a CHM file, step 2108 may be performed to encode the first byte block of the first file, step 2110 may be performed to write the first byte block from the second file, and at decision block 2112 it is determined that not all bytes have yet been written. The process 2100 would then move back to step 2110 to write the first byte block of the third file. After determining again at decision block 2112 that not all bytes have been written, the process 2100 may move back to step 2110 to write the next byte block of the first file, and so on until all bytes from all files are encoded. Once at decision block 2112 it is determined that all bytes from all files have been decoded, at step 2114 the CHM file is stored. The process 2100 then ends at step 2116.

Figure 22:
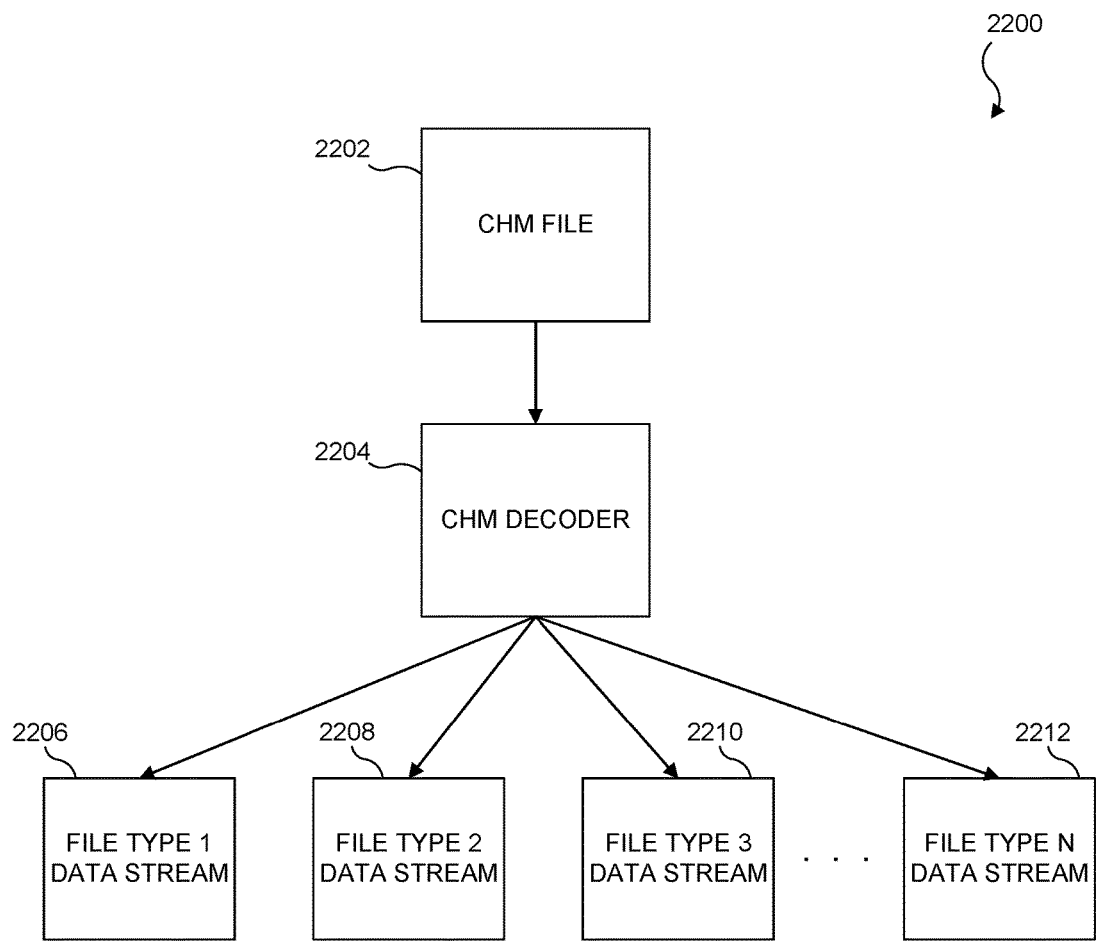
FIG. 22 illustrates a diagrammatic view of a CHM file decoding process wherein files of multiple file types are decoded, in accordance with various embodiments of the present disclosure.

Referring now to FIG. 22, there is illustrated a diagrammatic view of a CHM file decoding process 2200 wherein files of multiple file types are decoded, in accordance with various embodiments of the present disclosure. A CHM file 2202 containing the blended bytes of a plurality of files of various file types is processed by a CHM decoder 2204. The CHM decoder 2204 may perform a decoding operation such as those described herein. The CHM decoder 2204 decodes the CHM file 2202 into a plurality of data streams of various file types. There is shown in FIG. 22 a data stream of a first file type 2206, a data stream of a second file type 2208, a data stream of a third file type 2210, and a data stream of an nth file type 2212.

Figure 23:
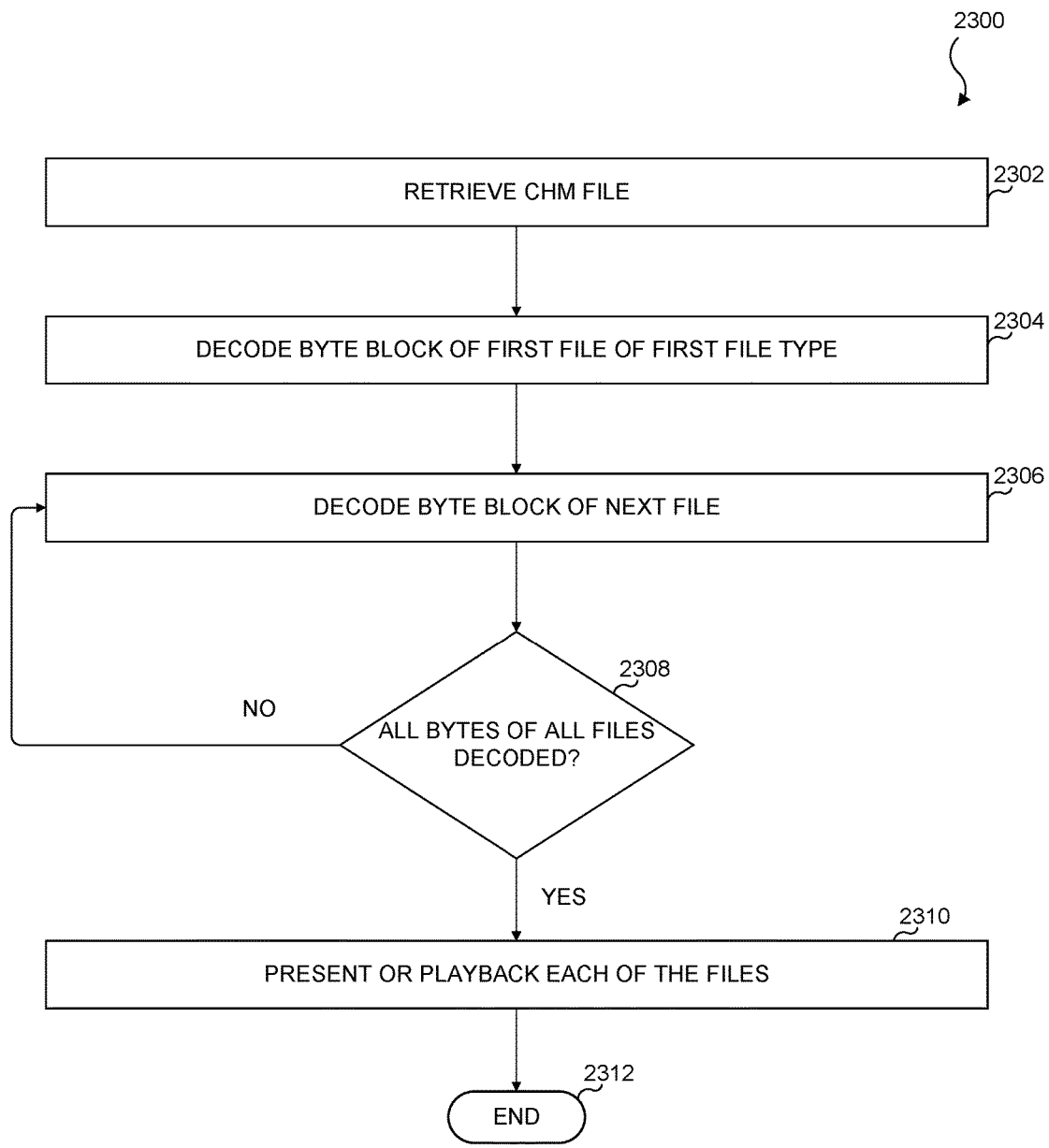
FIG. 23 illustrates a flowchart of a CHM file decoding process wherein files of multiple file types are decoded, in accordance with various embodiments of the present disclosure.

Referring now to FIG. 23, there is illustrated a flowchart of a CHM file decoding process 2300 wherein files of multiple file types are decoded, in accordance with various embodiments of the present disclosure. The process 2300 begins at step 2302 where a CHM file is retrieved. At step 2304, a byte block of a first file of a first file type is decoded from the CHM file. At step 2306, a byte block of a next file is decoded. At decision block 2308, it is determined whether all bytes of all the files have been decoded. If not, the process 2300 moves back to step 2306 to decode the next byte block of the next file. If it decision block 2308 it is determined that all bytes have been decoded, the process 2300 flows to step 2310. At step 2310, the decoded files may be presented or played back to a user. The process then ends at end block 2312.

Figure 24:
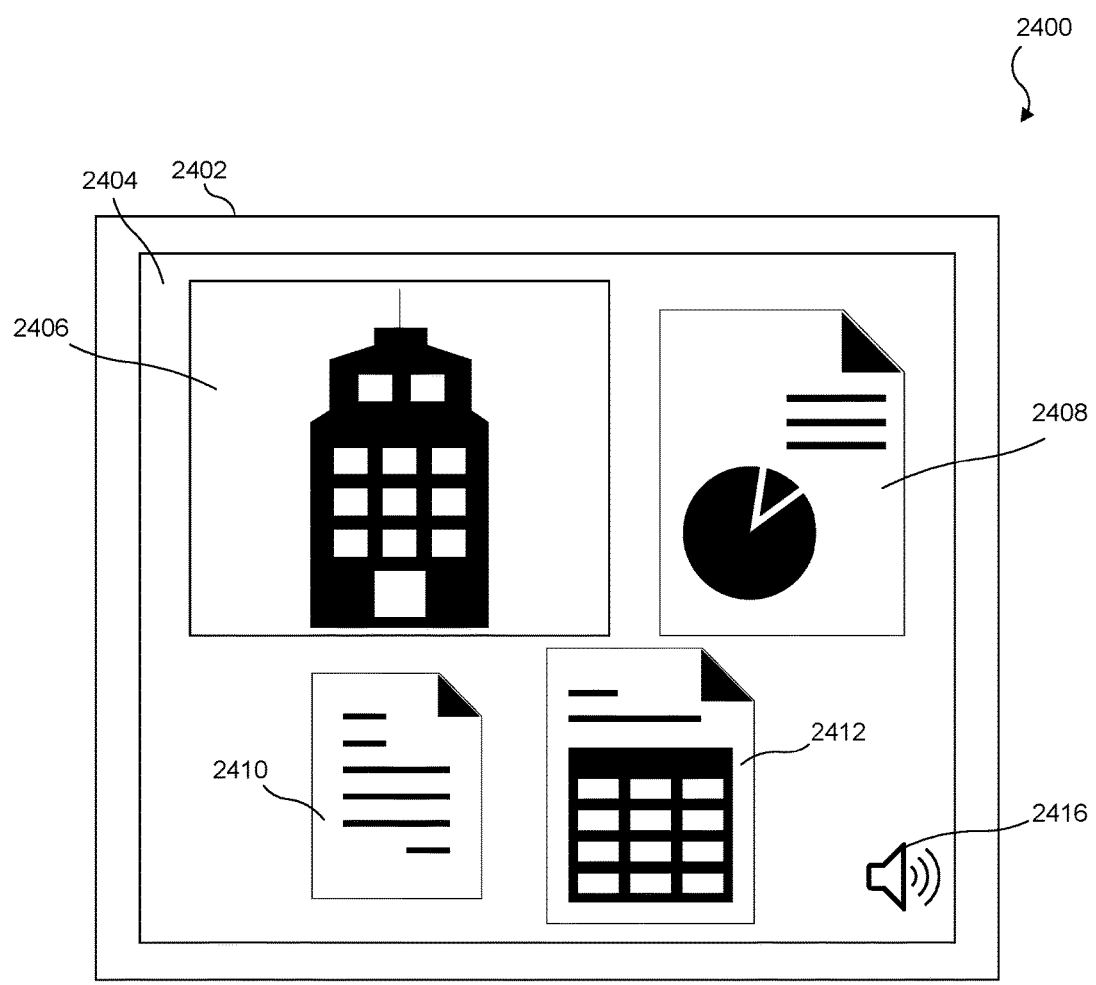
FIG. 24 illustrates a diagrammatic view of a multiple file type CHM presentation in accordance with various embodiments of the present disclosure.

Referring now to FIG. 24, there is illustrated a diagrammatic view of a multiple file type CHM presentation 2400, in accordance with various embodiments of the present disclosure. The presentation 2400 may be presented to a user after or during a successful CHM decoding operation such as that described herein. The presentation 2400 shows that a CHM file may allow for a full suite of files and information to be presented to a user. FIG. 24 illustrates a device 2402 including a screen 2404. The presentation 2400 presents on the screen 2404 a plurality of files of various file types For example, and as shown in FIG. 24, there may be presented an image 2406, a presentation document 2408 (such as a Microsoft Powerpoint document), a text document 2410, and a spreadsheet document 2412. While a user is viewing these files of differing file types, audio 2414 may be played back to provide the user additional information concerning what the user is seeing on the screen 2404.

Figure 25:
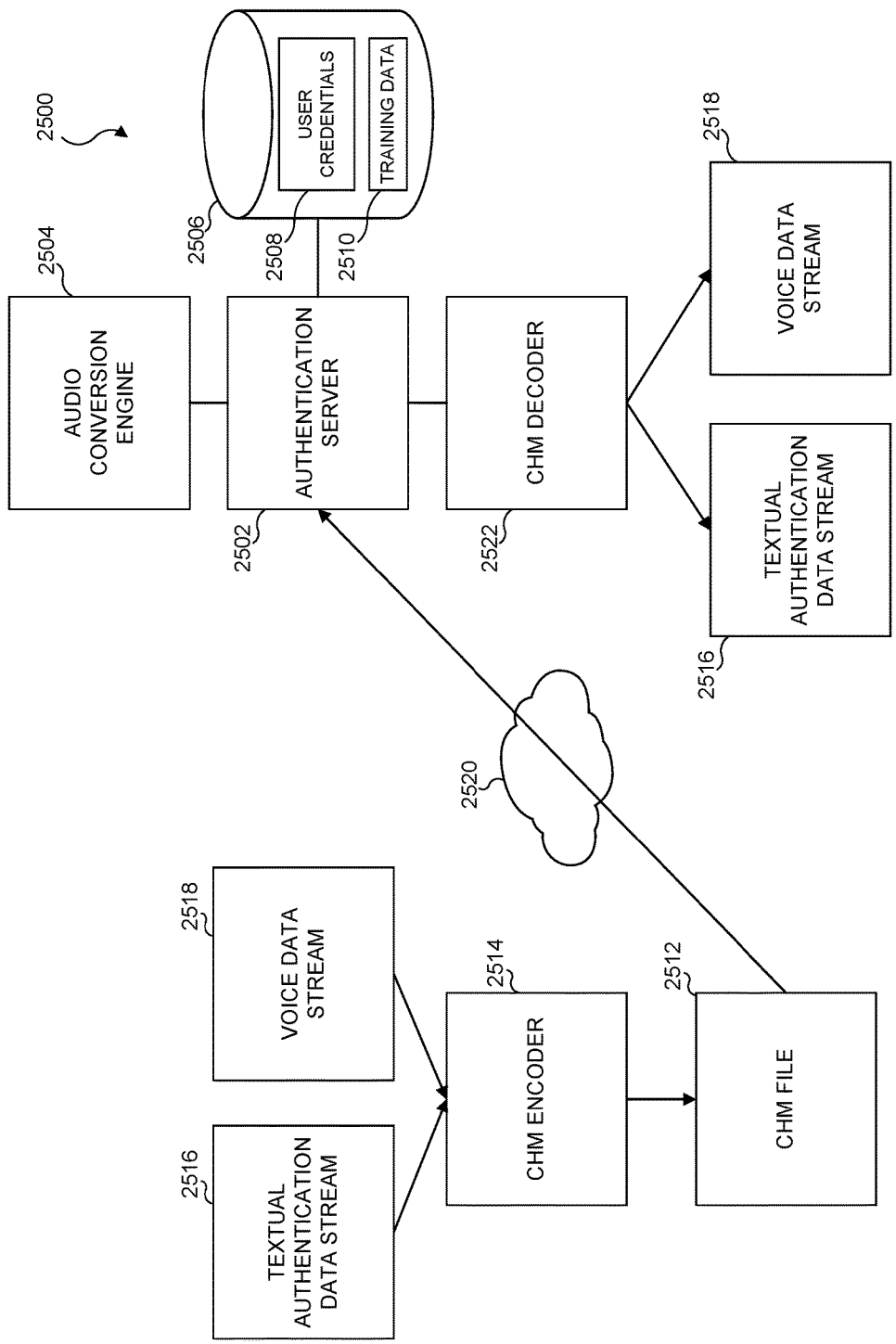
FIG. 25 illustrates a diagrammatic view of a voice authentication system utilizing CHM files, in accordance with various embodiments of the present disclosure.

Referring now to FIG. 25, there is illustrated a diagrammatic view of a voice authentication system 2500 utilizing CHM files, in accordance with various embodiments of the present disclosure. The system 2500 includes an authentication server 2502. The authentication server 2502 may include an audio conversion engine 2504 and a database 2506. The authentication server 2502 may use the audio conversion engine 2504 to recognize speech and convert audio to text and may use the database 2506 to recognize user speech patterns and commands to perform voice authentication for various purposes. The database 2506 may include user credentials 2508 and training data 2510. The user credentials 2508 may include user authentication data such as usernames, passwords, answers to security questions, and other information that the system might use to authenticate a user. The training data 2510 may include user-specific data that has been accumulated over time as the user has utilized the authentication server 2502 to authenticate items. The training data 2510 may record the speech patterns of a user to recognize the specific speech patterns for the user. The authentication server may perform voice recognition through acoustic and/or language modeling to determine what a user is saying in audio provided to the authentication server 2502.

The authentication server 2502 may receive a CHM file 2512 to be used in authentication. The authentication may be performed for various reasons, such as to authenticate a login on a website, authenticate access to documents, etc. For example, a user may be provided a contract to be viewed only by the user. In order to access the contract, the user may need to first authenticate the user's identity by providing a voiced command or password. As another example, a website or other service provided to the user such as a mobile device app, etc., that allows for accounts to be created may use voice authentication to login. If a user who previously created an account with a website is for some reason banned from the website, the server may keep a record of the user's voice authentication data. If that user ever tries to create a new account on the website to circumvent the ban, the website may ask for voice authentication to be set up by the user. The server may then check banned user voice authentication or training data in order to determine if the user attempting to create the new account has been banned previously. If so, the account creation may be denied.

A CHM encoder 2514 may receive a textual authentication data stream 2516 including items such as a username password, etc., and may also receive a voice data stream 2518. The CHM encoder 2514 may encode the textual authentication data stream 2516 and the voice data stream 2518 into the CHM file 2512. The CHM file 2512 may be transmitted over a network 2520 to the authentication server 2502 by a mobile device (not shown). Upon receiving the CHM file 2512, the authentication server 2502 may decode the CHM file 2512 to separate the textual authentication data stream 2516 from the voice data stream 2518. The authentication server 2502 may then compare the textual authentication data stream 2516 to the user credentials 2508 stored on the database 2506. If the textual authentication data stream 2516 provided matches the user credentials 2508 stored on the database 2506, the system may then perform speech recognition on the speech data proved by the user.

The speech may be received initially through a microphone and the analog sound waves are converted into a digital format by an analog-to-digital (A/D) converter. The digital data may be converted into a spectrogram showing how the frequencies of sound change in intensity over time using fast Fourier transform FFT. The data may then be separated into acoustic frames. The speech data may be analyzed for specific phonemes, phones, formants, etc. to recognize what is being said in the speech data. The speech patterns may also be analyzed to determine who is speaking in the recording. Over time, a user's training data is updated to more effectively recognize speech from that user. The system 2500 may also utilize neural networks to assist in speech recognition.

Figure 26:
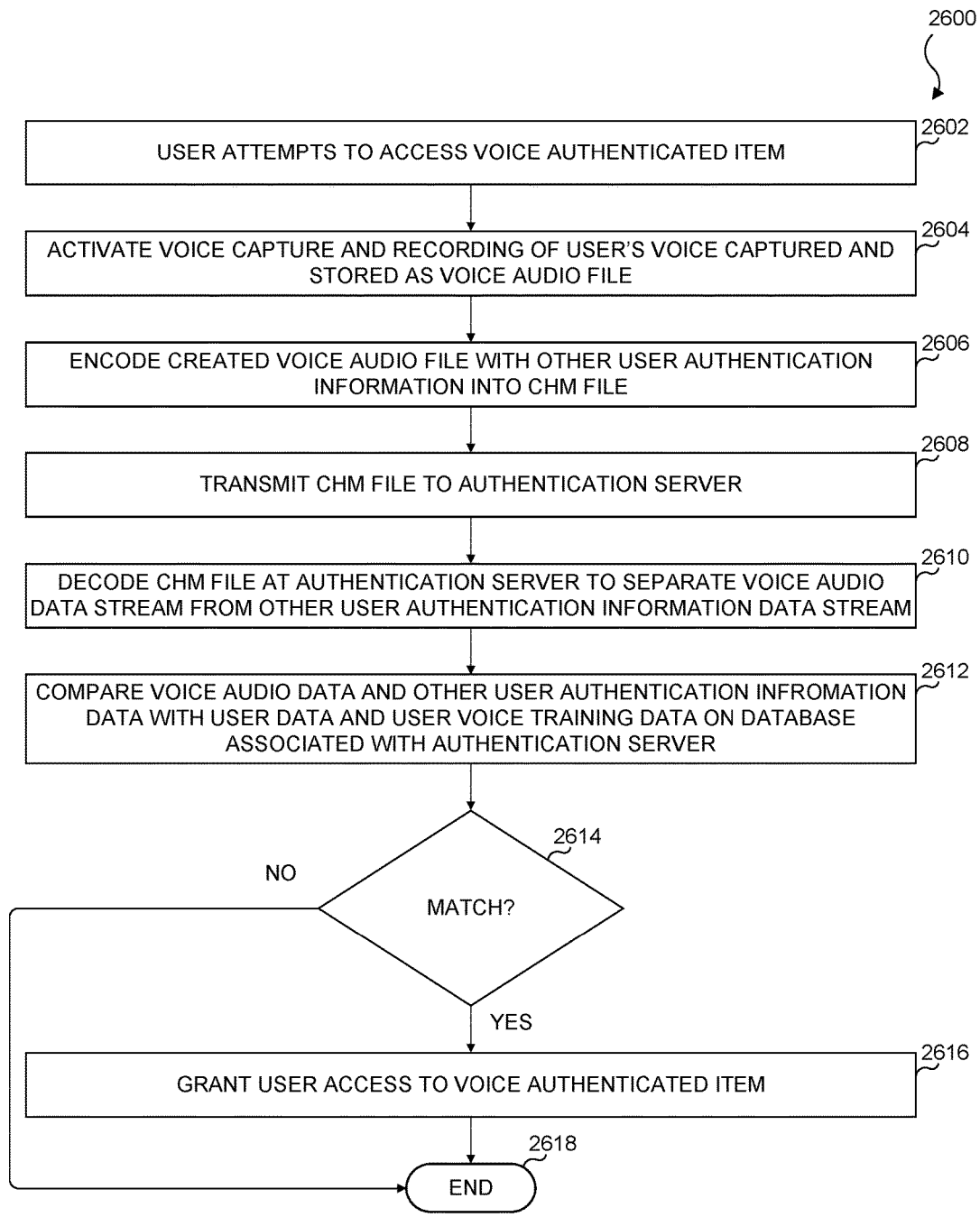
FIG. 26 illustrates a flowchart of a voice authentication process utilizing CHM files, in accordance with various embodiments of the present disclosure.

Referring now to FIG. 26, there is illustrated a flowchart of a voice authentication process 2600 utilizing CHM files, in accordance with various embodiments of the present disclosure. The process 2600 begins at step 2602 where a user attempts to access a voice authenticated item. At step 2604, the voice capture is activated and a recording of the user's voice is captured and stored as a voice audio file. At step 2606, the created voice audio file is encoded with other user authentication information into a CHM file, as described herein. The other user authentication information may include usernames, passwords, personal information, security questions and answers, etc. The other user authentication information may be in a text data type of format. At step 2608, the encoded CHM file is transmitted to an authentication server.

At step 2610, the authentication server decodes the CHM file to separate the voice audio data stream from the other user authentication information data stream. At step 2612, the authentication server compares the voice audio data with voice training data on an associated database and may also perform speech recognition processes using an audio conversion engine. Also, at step 2612, the authentication server may compare the other user information data with user data stored on the authentication server or associated database. At decision block 2614, it is determined whether there is a match between the other user authentication information and the user data stored on the authentication server or associated database, as well as if there is a match between the voice audio data and the training data. If there is a match, the process 2600 moves to step 2616 and grants the user access to the voice authenticated item. The process 2600 then ends at end block 2618. If at decision block 2614 no match is found, the process 2600 ends at end block 2618.

Figure 27:
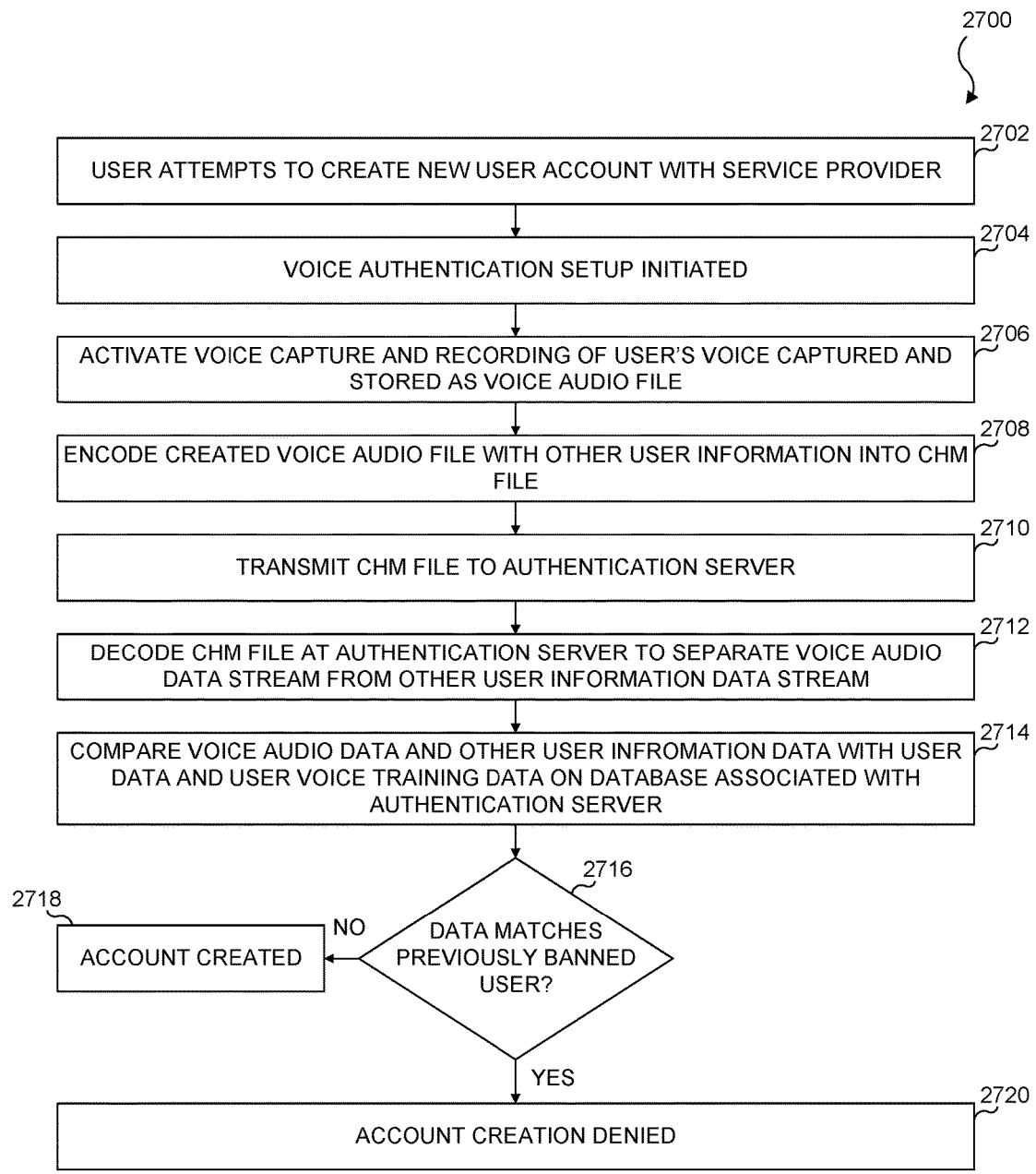
FIG. 27 illustrates an account creation abuse prevention process, in accordance with various embodiments of the present disclosure.

Referring now to FIG. 27, there is illustrated an account creation abuse prevention process 2700, in accordance with various embodiments of the present disclosure. At step 2702, a user attempts to create a new user account with a service provider, such as a website or other service provided to users such as a mobile device app, etc., that allows for accounts to be created. At step 2704, voice authentication setup is initiated. The voice authentication setup may be required to complete account creation. At step 2706, voice capture is activated and a recording of the user's voice is captured and stored as a voice audio file. At step 2708, the created voice audio file is encoded with other user information into a CHM file, as described herein. The other user information may include information the user has entered to be used for the user's potential new account, such as usernames, passwords, personal information, security questions and answers, etc. The other user information may be in a text data type of format. At step 2710, the encoded CHM file is transmitted to an authentication server.

At step 2712, the authentication server decodes the CHM file to separate the voice audio data stream from the other user information data stream. At step 2714, the authentication server compares the voice audio data with voice training data on an associated database and may also perform speech recognition processes using an audio conversion engine. Also, at step 2714, the authentication server may compare the other user information data with user data stored on the authentication server or associated database. At decision block 2716, it is determined whether the data decoded from the CHM file matches data stored on the authentication server or the associated database for a user that was previously banned from the service. All the textual user information may be checked against user data stored on the authentication server or the database for a match.

In some cases, if the user is attempting to create an account after another account owned by the user was banned, the user may use false textual data to try to create a new account. Therefore, the authentication server may also compare the voice data decoded from the CHM file against voice data stored on the authentication server or the database to determine if the user's voice data is already present on the database. If no match is found, at step 2718, the user account may be created, barring no other issues. If at decision block 2716 a match is found, at step 2720, account creation may be denied to prevent the user from abusing account creation to circumvent a ban on the user's account.

Figure 28:
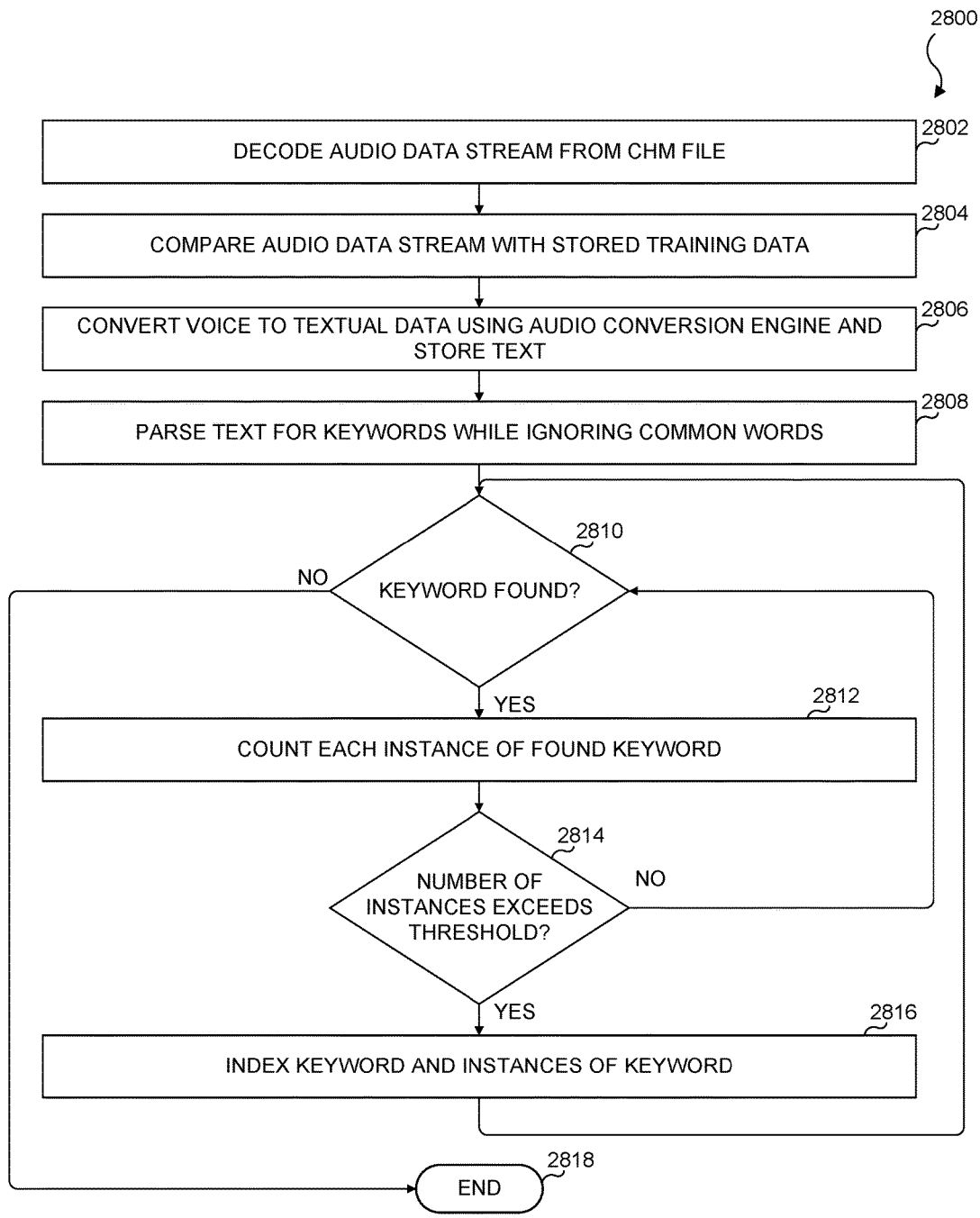
FIG. 28 illustrates a voice-to-text and indexing process utilizing CHM files, in accordance with various embodiments of the present disclosure.

Referring now to FIG. 28, there is illustrated a voice-to-text and indexing process 2800 utilizing CHM files, in accordance with various embodiments of the present disclosure. The process 2800 begins at step 2802 where a device, such as authentication server 2502, decodes an audio data stream from a CHM file. At step 2804, the audio data stream is compared to stored training data. At step 2806, the audio data stream is converted to textual data, such as by the audio conversion engine 2504, and the textual data is stored. At step 2808, the stored textual data is parsed for keywords, while ignoring common words. For example, the system may be configured to recognize verbs and nouns, and ignore article adjectives, conjunctions, etc.

At decision block 2810, it is determined whether a keyword is found during the text parsing operation of step 2808. If not, the process 2800 ends at end block 2818. If so, the process 2800 flows to step 2812. At step 2812, each instance of the particular keyword found during the parsing operation is counted. At decision block 2814, it is determined whether the number of instances counted for the keyword exceeds a threshold. In some embodiments, the number of times a keyword appears may be used in determining whether to index that keyword. For example, if the word is only used one time, the word may not be indexed. However, if the word is used over ten times, for example, the word may be indexed. If at decision block 2814 it is determined that the number of counted instances for the keyword does not exceed the threshold, the process 2800 moves back to decision block 2810 to determine if another keyword is found. If at decision block 2814 it is determined that the number of counted instances for the keyword exceeds the threshold, the process moves to step 2816. At step 2816, the keyword and the instances of the keywords are indexed. The process then moves back to decision block 2810 to determine if additional keywords are found during the parsing operation. If not, the process 2800 ends at end block 2818.

Figure 29:
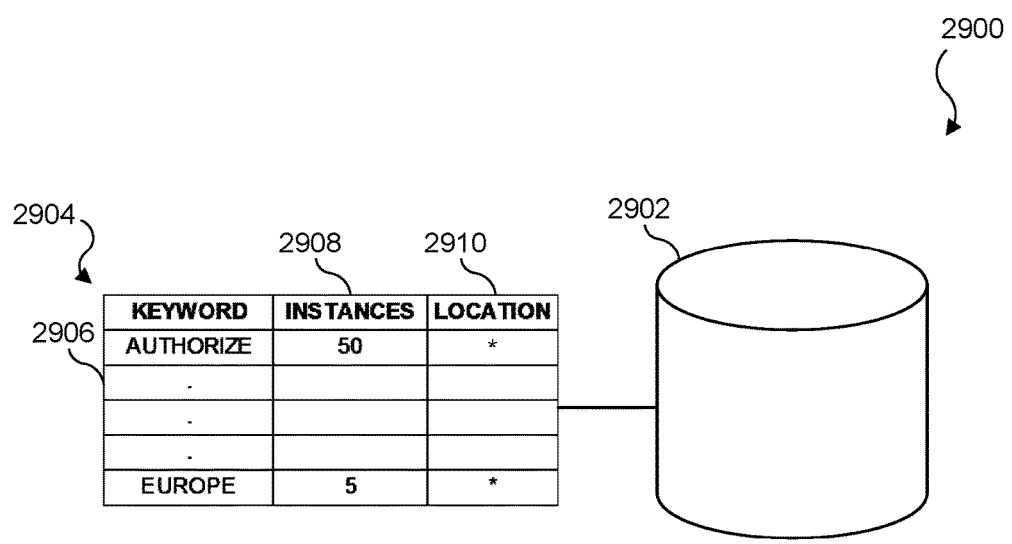
FIG. 29 illustrates a diagrammatic view of a database keyword index system, in accordance with various embodiments of the present disclosure.

Referring now to FIG. 29, there is illustrated a diagrammatic view of a database keyword index system 2900, in accordance with various embodiments of the present disclosure. There is illustrated a database 2902 having stored thereon keyword data 2904. The keyword data 2904 may be user-specific, or may encompass all users who provided text to the database 2902. The keyword data may include keywords 2906. The keywords 2906 may be all keywords previously indexed. The keyword data 2904 may also include instance data 2908 that includes the number of instances a keyword was used. Location data 2910 may also be stored. The location data 2910 may indicate where the text data that the keyword appears is stored in association with the database, such as a server. The location data 2910 may also be configured to point to each specific instance of the keyword. For example, if a keyword appears five times in a particular document, the location data 2910 may provide a file path to that document, and a link to each instance of the keyword within that document.

Figure 30:
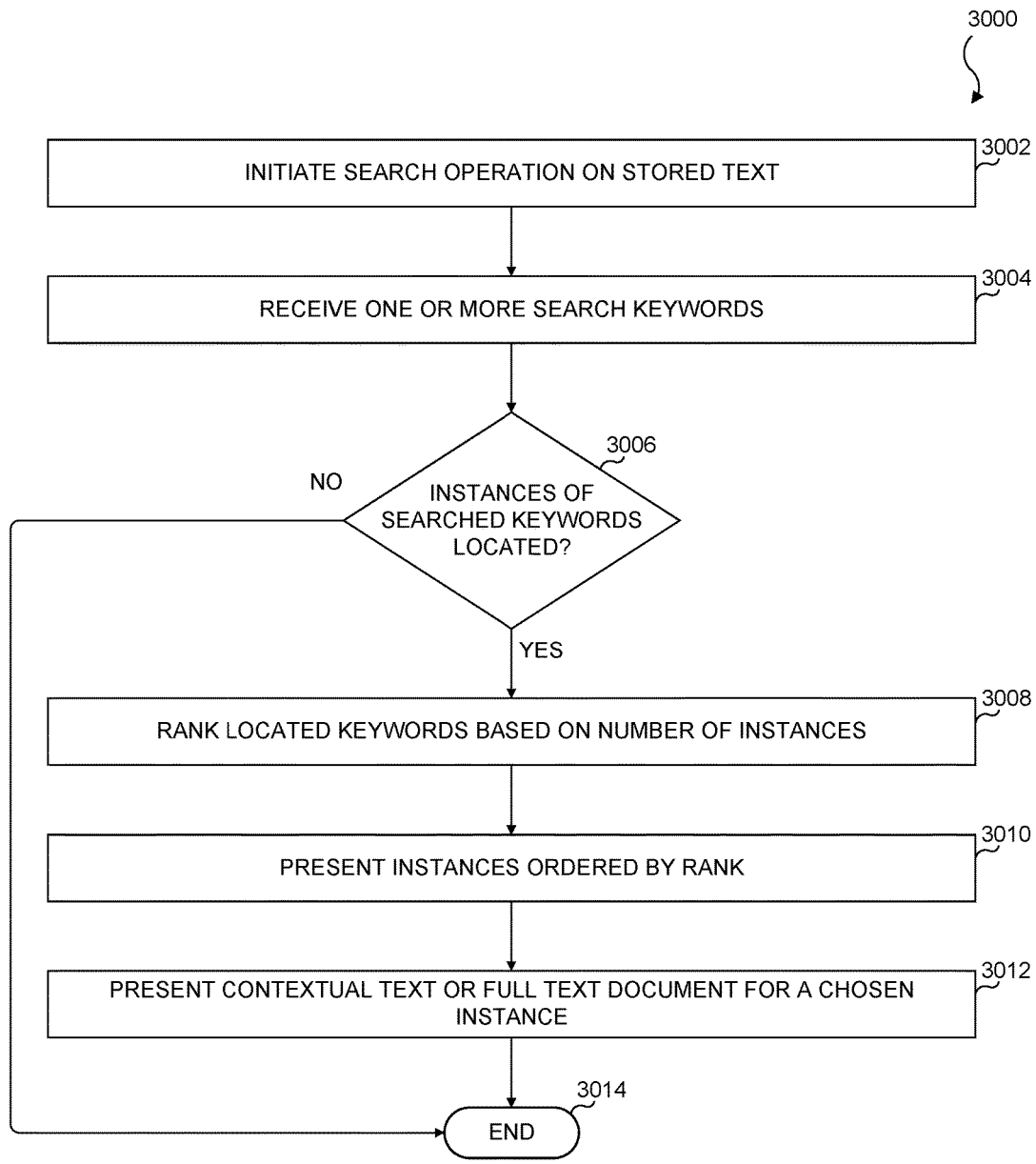
FIG. 30 illustrates a keyword search process, in accordance with various embodiments of the present disclosure.

Referring now to FIG. 30, there is illustrated a keyword search process 3000, in accordance with various embodiments of the present disclosure. The process 3000 begins at step 3002 where a search operation is initiated on stored text. At step 3004, one or more search keywords are received by a device, such as a server. At decision block 3006, it is determined whether any instances of the one or more search keywords are found. If not, the process 3000 ends at end block 3014. If so, the process 3000 moves to step 3008. At step 3008, the located keywords are ranked based on the number of instances for that keyword. At step 3010, the instances of the found keywords may be presented to a user in a list ordered by rank. At step 3012, in response to the user selecting one of the presented instances of the found keywords, contextual text or the full text document in which the keyword appears may be presented to the user. The process 3000 then ends at end block 3014.

Figure 31:
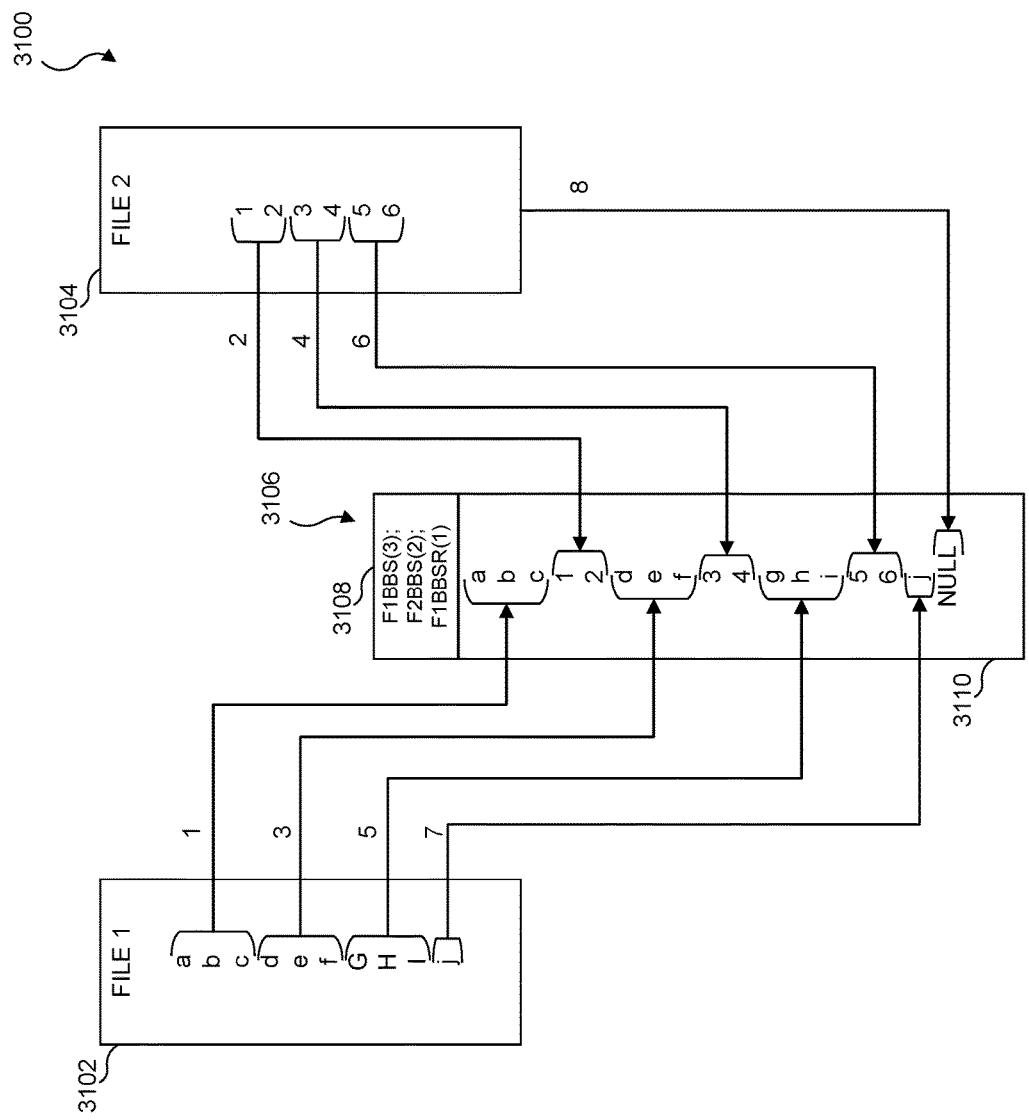
FIG. 31 illustrates a diagrammatic view of a combined file encoding process with remainders in accordance with various embodiments of the present disclosure.

Referring now to FIG. 31, there is illustrated a diagrammatic view of a combined file encoding process 3100 with remainders. There is illustrated a first file 3102, and second file 3104, and a combined file 3106. It is determined in accordance with processes described herein that the byte block size for the first file is 3 bytes, while the byte block size for the second file is 2 bytes. Either before encoding the bytes to the combined file 3106, or after such encoding, a header section 3108 of the combined file 3106 may be populated with information pertaining to the first file 3102 and the second file 3104. This information may include the byte block size assigned to the first file 3102 and the second file 3104. For example, as shown in FIG. 31, the header section 3108 includes the information "F1BBS(3); F2BBS (2); F1BBSR(1)," which indicates that the first file byte block size is equal to 3, the second file byte block size is equal to 2, and the first file has a remainder of bytes equal to 1 byte.

As illustrated in FIG. 31, the combined file 3106 has a body section 3110 including a plurality of bytes. Since the byte block size for the first file 3102 is three, at a first step the first three bytes of the first file 3102 are written to the combined file 3106. Since the byte block size for the second file 3104 is two, at a second step the first two bytes from the second file 3104 are written to the combined file 3106 after the first three bytes written to the combined file 3106 from the first file 3102 in the first step. At a third step, the next three bytes of the first file 3102 are written to the combined file 3106 after the first two bytes written to the combined file from the second file 3104. At a fourth step, the next two bytes are written from the second file 3104 to the combined file 3106. At a fifth step, the next three bytes are written from the first file 3102 to the combined file 3106. At a sixth step, the next, and last, two bytes are written from the second 3104 file to the combined file 3106.

At a seventh step, the first file only has one byte left, which is smaller than the assigned three byte block size. The encoder may have already analyzed the first file 3102 and determined there would be one byte left, or the encoder may have set the byte block size for the first file 3102 and, when encountering the end of the file with a number of bytes less than the byte block size, the encoder simply takes the remaining bytes and writes them to the combined file 3106. At an eighth step, the second file 3104 may be checked again, and it may be determined that the second file 3104 does not have any bytes left. In this case the encoder may simply move on, or it may write a NULL value in the combined file 3106.

Figure 32:
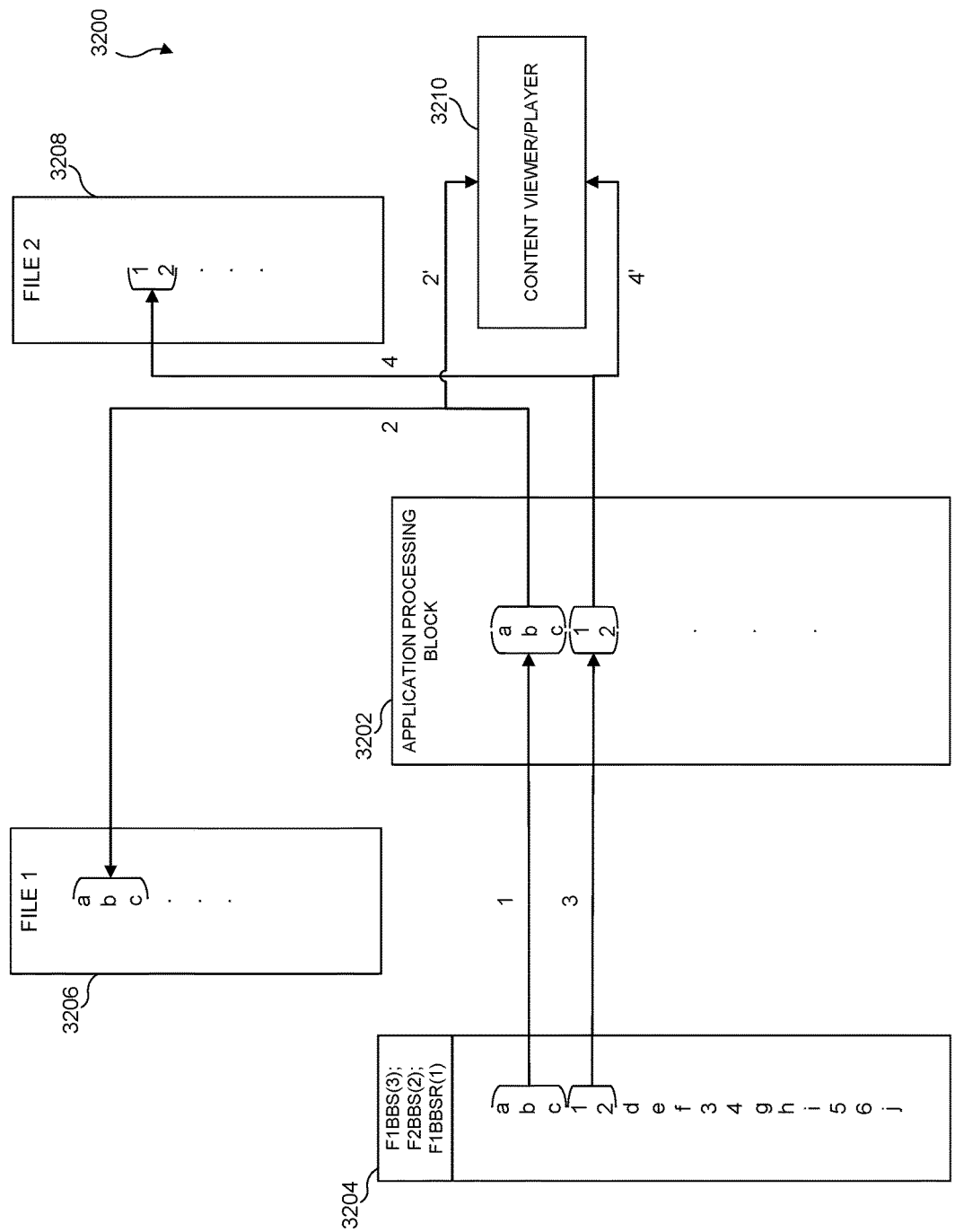
FIG. 32 illustrates a diagrammatic view of a combined file decoding process in accordance with various embodiments of the present disclosure.

Referring now to FIG. 32, there is illustrated a diagrammatic view of a combined file decoding process 3200. The process 3200 includes an application processing block 3202 that may be part of the codec or decoder, or part of another application, such as an application that calls a codec or an encoder/decoder API in order to perform encoding or decoding steps. A combined file 3204 is decoded to extract data streams pertaining to a first file 3206 and a second file 3208. During the decoding process, the application processing block 3202 may receive data streams pertaining to the first file 2306 and the second file 3208 a byte block at a time. As the application processing block 3202 receives each byte block, the application processing block 3202 may write the byte block to the appropriate one of the first file 3206 or the second file 3208. At substantially the same time, the application processing block 3202 may also utilize the byte blocks for further processing or for displaying content included within the byte blocks.

For example, as illustrated in FIG. 32, at a first step 1 a byte block the size of three bytes is copied from the combined file 3204 by the application processing block 3202. At a second step 2, the application processing block writes to the first file 3206 the byte block copied in the first step 1. At substantially the same time as the second step 2, a step 2' is taken to provide the bytes copied in the first step 1 to a content viewer or player 3210, to display the content copied from the combined file 3204 so far. For example, if the content viewer or player 3210 allows for audio to be played back, and the bytes copied in the first step 1 pertain to audio content, the content viewer or player 3210 may begin playing the partial audio file copied in the first three bytes of the combined file 3202. Thus, since streams of data are being pulled from the combined file 3202, this data can be used even before all the data byte are copied from the combined file 3204 and written to the first file 3206 and the second file 3208.

At a third step 3, the application processing block 3202 copies the next two bytes from the combined file 3204 that pertain to the second file 3208. At a fourth step, the application processing block 3202 writes the two bytes copied at the third step 3 to the second file 3208. At substantially the same time, at a step 4', the application processing block 3202 may provide the two bytes copied in the third step 3 to the content viewer or player 3210 so that the content viewer or player 3210 may begin using the data stream pertaining to the second file 3208. This pattern may continue until all the bytes from the combined file have been copied and written to the first file 3206 and the second file 3208.

Figure 33:
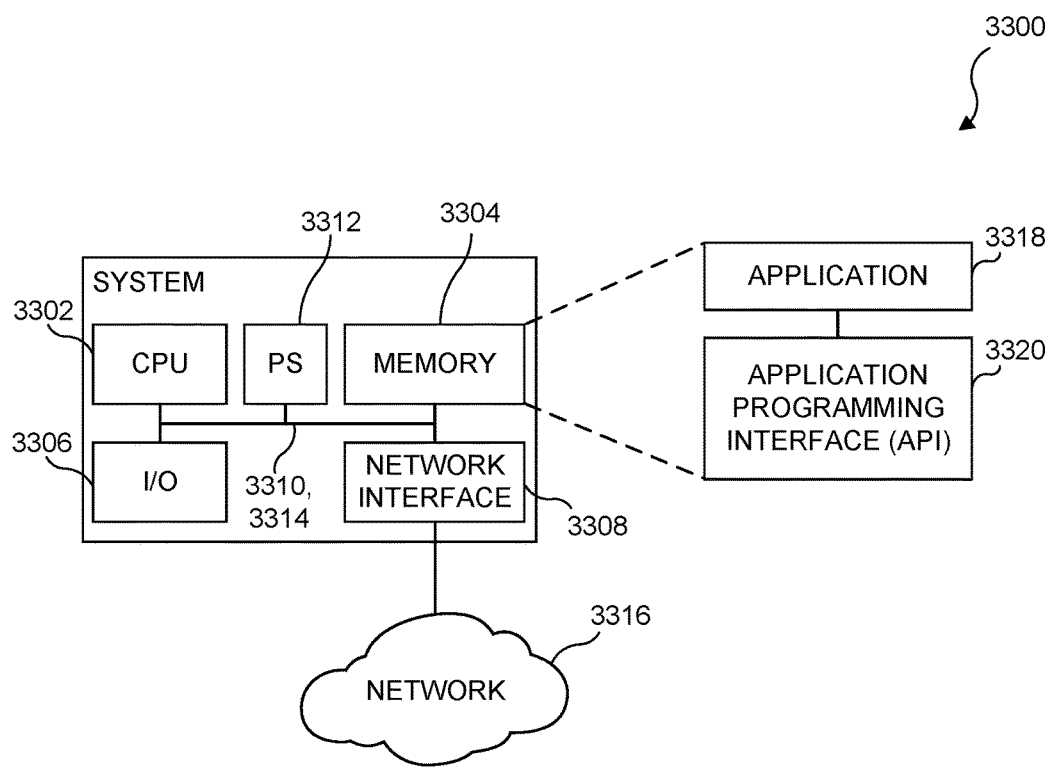
FIG. 33 illustrates a diagrammatic view of one embodiment of a system device that may be used within the environment described herein.

Referring to FIG. 33, one embodiment of a system device 3300 is illustrated. The system device 3300 is one possible example of a device used by an end user, such as a mobile device, a device used in the systems described herein, such as the authentication server 2502, or one other devices. Embodiments include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the device may be implemented in many different ways and by many different types of systems, and may be customized as needed to operate within a particular environment.

The system 3300 may include a controller (e.g., a central processing unit ("CPU")) 3302, a memory unit 3304, an input/output ("I/O") device 3306, and a network interface 3308. The components 3302, 3304, 3306, and 3308 are interconnected by a transport system (e.g., a bus) 3310. A power supply (PS) 3312 may provide power to components of the computer system 3300, such as the CPU 3302 and memory unit 3304, via a power system 3314 (which is illustrated with the transport system 3310 but may be different). It is understood that the system 3300 may be differently configured and that each of the listed components may actually represent several different components. For example, the CPU 3302 may actually represent a multi-processor or a distributed processing system; the memory unit 3304 may include different levels of cache memory, main memory, hard disks, and remote storage locations; the I/O device 3306 may include monitors, keyboards, and the like; and the network interface 3308 may include one or more network cards providing one or more wired and/or wireless connections to a network 3316. Therefore, a wide range of flexibility is anticipated in the configuration of the computer system 3300.

The system 3300 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 3300. The operating system, as well as other instructions, may be stored in the memory unit 3304 and executed by the processor 3302. For example, the memory unit 3304 may include instructions for performing some or all of the methods described herein. These instructions may reside within an application 3318. The application 3318 may also include an application programming interface (API) 3320. The application 3318 may in some embodiments be the CHM code, CHM encoder, CHM decoder, etc. In some embodiments, the API 3320 may be an API for a CHM codec, CHM encoder, CHM decoder, etc., allowing for API calls to be made in order to initiate CHM encoding and decoding operations.

It will be understood that the CHM file, encoding and decoding operations, and other processes described herein may include data compression steps, encryption steps, or other processes to either decrease the file size for transmission of the CHM file or provide additional security.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of a codec for encoding data streams into a combined file, comprising:
   accessing a first file including a first plurality of data bytes;
   accessing a second file including a second plurality of data bytes; and
   combining the first file and the second file to provide the combined file including only one header and one body, comprising the steps of:
     in a first storing step, sequentially storing a first file byte block of a first byte block size in the body of the combined file, wherein the first file byte block includes one or more bytes of data from the first plurality of data bytes of the first file,
     in a second storing step, sequentially storing a second file byte block of a second byte block size in the body of the combined file, wherein the second file byte block includes one or more bytes of data from the second plurality of data bytes of the second file,
     repeating the first and second storing steps to sequentially store the first plurality of data bytes of the first file and the second plurality of data bytes of the second file in the body of the combined file,
     wherein the first plurality of data bytes and the second plurality of data bytes are both stored in the one body of the combined file in association with only the one header separate from the body, and
     wherein no byte block from the first file is stored adjacent another byte block from the first file, and no byte block from the second file is stored adjacent another byte block from the second file, and
   storing, in the header of the combined file, a number of bytes of the first file and the second file, the first byte block size, and the second byte block size, wherein the first byte block size and the second byte block size are determined according to a file size relationship between the first file and the second file for use in a decoding process of the combined file.

2. The method of claim 1, wherein the first file is of a first file format and the second file is of a second file format.

3. The method of claim 2, wherein the first file is an image file and the second file is a non-image file.

4. The method of claim 1, wherein the first file byte block and the second file byte block are stored in sequential and adjacent storage locations in the combined file.

5. The method of claim 1, further comprising:
   transferring the combined file to an application processing block to decode the combined file into the first and second files by the steps of:
     reading the header to determine the first byte block size and the second byte block size,
     sequentially accessing a first number of bytes corresponding to the first byte block size and a second number of bytes corresponding to the second byte block size, and
     creating the first and second files with the accessed first number of bytes and the accessed second number of bytes, respectively.

6. The method of claim 1, further comprising calculating the first byte block size and the second byte block size in accordance with a ratio that is a number of bytes of the first file to a number of bytes of the second file.

7. The method of claim 1, further comprising calculating the first byte block size and the second byte block size, including:
   determining which of the first file and the second file includes a greater number of bytes;
   dividing a number of bytes of the first file or the second file that includes the greater number of bytes by the other one of the first file or the second file to produce a result;
   determining if the result includes a remainder and, if so, rounding the result up to an integer that is a next integer up from the result; and
   for the first file or the second file that includes the greater number of bytes, setting the first byte block size of the first file or the second byte block size of the second file to be equal to the integer.

8. The method of claim 7, wherein if a total number of data blocks in either of the first file or the second file causes, after all previous bytes in the first file or the second file are written, there to be a number of bytes left in either the first file or the second file that is, for the first file, less than the first byte block size, or, for the second file, less than the second byte block size, the method further comprises:
   storing a partial byte block in the combined file, wherein the partial byte block is associated with one of the first file or the second file and wherein the partial byte block includes a number of data bytes less than the first byte block size or the second byte block size of the first file or the second file, respectively, that is associated with the partial byte block.

9. The method of claim 8, wherein calculating the first byte block size and the second byte block size further includes:
   setting the second byte block size to one byte; and
   determining if a speed multiplier is to be set and, if so, setting the speed multiplier, wherein the speed multiplier is a value to manipulate the first byte block size and the second byte block size to set the first byte block size to a result of the value multiplied by the first byte block size and to set the second byte block size to a result of the value multiplied by the second byte block size.

10. The method of claim 1, further comprising:
    creating a plurality of combined files from a plurality of files in accordance with the first and second storing steps, and the repeating step; and
    assembling each of the plurality of combined files into a binder file, wherein the binder file includes a number of combined files for simultaneous decoding and presentation.

11. A method of a codec for decoding a data stream of a combined file into separate data streams, comprising:
    analyzing header data included in a header of the combined file, wherein the combined file includes only one header and includes both data from a first data stream of a first original file and data from a second data stream of a second original file in one body of the combined file in association with only the one header separate from the body;

reading from the header data a number of bytes of the first original file and the second original file, and a byte block size for each of a first data stream and a second data stream, wherein a byte block includes one or more bytes of data within a file, and wherein the byte block size for each of the first data stream and the second data stream are determined according to a file size relationship between the first original file and the second original file;

reading a first file byte block included in the combined file, wherein the first file byte block includes a number of bytes in the combined file corresponding to the byte block size for the first data stream read from the header of the combined file;

writing the first file byte block to a first file;

reading a second file byte block included in the combined file, wherein the second file byte block includes a number of bytes in the combined file corresponding to the byte block size for the second data stream read from the header of the combined file; and writing the second file byte block to a second file.

12. The method of claim 11, wherein the first file is of a first file type and the second file is of a second file type.

13. The method of claim 12, wherein the first file is an image file and the second file is a non-image file.

14. The method of claim 11, further comprising:
determining if each byte included within the combined file has been read from the combined file and written to one of the first file or the second file; and
repeating, upon a determination that each of the bytes included within the combined file have not been written to one of the first file or the second file, the reading, writing, and determining steps.

15. The method of claim 11, wherein the byte block sizes for each of the first data stream and the second data stream are byte block sizes used during creation of the combined file.

16. The method of claim 11, further comprising:
receiving by the codec a binder file from a source over a network, wherein the binder file includes a plurality of combined files;
decoding the plurality of combined files into a plurality of data streams, wherein decoding of each combined file is performed in accordance with the analyzing, reading, and writing steps; and
simultaneously presenting each of the plurality of data streams in distinct portions of a screen of a computing device, wherein each of the plurality of data streams is of a different data type.

17. The method of claim 11, wherein the first file is a text file type and the second file is an audio file type, the method further comprising:
receiving by the codec the combined file from a source over a network;
determining that the first file decoded from the combined file includes textual user authentication information;
determining that the second file decoded from the combined file includes voice data;
comparing the textual user authentication information from the decoded first file to user credentials stored on a server;
performing speech recognition on the voice data from the decoded second file with speech data stored on the server in association with the user credentials; and
granting access to a resource if the voice data matches the speech data and if the textual user authentication information matches the user credentials.

18. A system for encoding data streams into a combined file and decoding the combined file into separate data streams, comprising:
a network interface coupled to a processor; and
a memory coupled to the processor,
the processor configured to:
access a first file including a first plurality of data bytes;
access a second file including a second plurality of data bytes; and
combine the first file and the second file to provide the combined file including only one header and one body, wherein, during combining, the processor is further configured to:
in a first storing step, sequentially store a first file byte block of a first byte block size in the body of the combined file, wherein the first file byte block includes one or more bytes of data from the first plurality of data bytes of the first file,
in a second storing step, sequentially store a second file byte block of a second byte block size in the body of the combined file, wherein the second file byte block includes one or more bytes of data from the second plurality of data bytes of the second file,
repeat the first and second storing steps to sequentially store the first plurality of data bytes of the first file and the second plurality of data bytes of the second file in the body of the combined file, wherein the first plurality of data bytes and the second plurality of data bytes are both stored in the one body of the combined file in association with only the one header separate from the body, and
wherein no byte block from the first file is stored adjacent another byte block from the first file, and no byte block from the second file is stored adjacent another byte block from the second file, and
store, in the header, information relating to a number of bytes of the first file and the second file, the first byte block size, and the second byte block size, wherein the first byte block size and the second byte block size are determined according to a file size relationship between the first file and the second file for use in a decoding process of the combined file.

19. The system of claim 18, wherein the first file is of a first file format and the second file is of a second file format.

20. The system of claim 19, wherein the first file is an image file and the second file is a non-image file.

21. The system of claim 18, wherein the processor is further configured to:
calculate the first byte block size and the second byte block size, including:
determine which of the first file and the second file includes a greater number of bytes;
divide the number of bytes of the first file or the second file that includes the greater number of bytes by the other one of the first file or the second file to produce a result;

determine if the result includes a remainder and, if so, rounding the result up to an integer that is a next integer up from the result; and for the first file or the second file that includes the greater number of bytes, set the first byte block size of the first file or the second byte block size of the second file to be equal to the integer.

22. The system of claim 18, wherein the processor is further configured to:

analyze header data included in the combined file;

calculate a byte block size for each of the first file and the second file based on byte block size data included in the header data;

read a combined file byte block included in the combined file, wherein the combined file byte block includes a number of bytes in the combined file corresponding to the byte block size calculated for the first file;

write the combined file byte block to a third file;

read a next combined file byte block included in the combined file, wherein the next combined file byte block includes a number of bytes in the combined file corresponding to the byte block size calculated for the second file; and write the next combined file byte block to a fourth file.

23. The system of claim 22, wherein the processor is further configured to:

determine whether each byte included within the combined file has been read from the combined file and written to one of the third file or the fourth file; and repeat, upon a determination that each of the bytes included within the combined file have not been written to one of the third file or the fourth file, the read, write, and determine steps.

* * * * *